United States Patent [19]
Gotou

[11] Patent Number: 5,872,442
[45] Date of Patent: Feb. 16, 1999

[54] BRUSHLESS MOTOR

[75] Inventor: Makoto Gotou, Nishinomiya, Japan

[73] Assignee: Matsushita Electric Industrial Co., Ltd., Kadoma, Japan

[21] Appl. No.: 899,459

[22] Filed: Jul. 23, 1997

[30] Foreign Application Priority Data

Aug. 1, 1996 [JP] Japan .................................. 8-203975

[51] Int. Cl.⁶ ...................................................... H02P 1/24
[52] U.S. Cl. ......................... 318/727; 318/254; 318/138; 318/439
[58] Field of Search .................................. 318/727, 254, 318/138, 439

[56] References Cited

U.S. PATENT DOCUMENTS

| | | |
|---|---|---|
| 4,963,808 | 10/1990 | Torisawa et al. .................... 318/254 X |
| 5,006,768 | 4/1991 | Rozman . |
| 5,231,338 | 7/1993 | Bulgarelli et al. . |
| 5,376,866 | 12/1994 | Erdman . |
| 5,493,188 | 2/1996 | Yoshikawa et al. . |
| 5,660,471 | 8/1997 | Yoshiike et al. .................... 318/254 X |

FOREIGN PATENT DOCUMENTS

Hei 6-165576  6/1994  Japan .
Hei 8-23695   1/1996  Japan .

*Primary Examiner*—Karen Masih
*Attorney, Agent, or Firm*—Panitch Schwarze Jacobs & Nadel, P.C.

[57] ABSTRACT

A brushless motor has a field part 20, three-phase coils 21, 22, and 23, a drive block 40 for supplying a power to the coils in accordance with output signals of a position detecting block 30, and a rotation detecting block 10 for producing a rotation signal and a direction signal by using output signals of the position detecting block 30. The rotation detecting block 10 has a shaped position signal producing circuit 11 for producing plural-phase shaped position signals, a rotation signal producing circuit 12 for producing the rotation signal synchronized with the shaped position signals, and a direction signal producing circuit 13 for producing the direction signal in correspondence with levels of the shaped position signals at a timing of a level change of the rotation signal.

18 Claims, 27 Drawing Sheets

BRUSHLESS MOTOR

BACKGROUND OF THE INVENTION

The invention relates to a brushless motor for rotating a disk or the like.

Recently, in a brushless motor for rotating a disk or the like, a waveform shaping circuit is used for detecting a rotation of the motor in order to measure a rotational speed of the motor. As disclosed in, for example, the unexamined published Japanese patent application (TOKKAI) SHO 63-256013, the waveform shaping circuit is configured so as to produce a pulse signal by shaping an alternating signal of a frequency proportional to the rotational speed of the motor.

FIG. 27 shows configurations of a detector and the waveform shaping circuit which are used in detection of the rotation in the prior art. In an optical disk 2002 attached to a rotor shaft 2001, slits are formed at regular angular intervals. A light emitting diode 2010 and a phototransistor 2011 are attached to a support member 2003 fixed to the stator, so as to face each other across the slits of the optical disk 2002. A detection signal from the phototransistor 2011 is amplified by a linear amplifier circuit 2020, and an alternating signal 2101 is output. Accordingly, in response to the rotation of the optical disk 2002, the alternating signal 2101 of a frequency which is proportional to the rotational speed of the rotor is generated in the phototransistor 2011 and the amplifier circuit 2020.

A first comparator block 2110 having no hysteresis receives the alternating signal 2101, and produces a shaped signal 2141 which is obtained by comparing and shaping the alternating signal 2101. The first comparator block 2110 comprises a comparator 2111, an inverting circuit 2112, and a DC voltage source 2113. A second comparator block 2120 having a predetermined hysteresis width corresponding to resistors 2121 and 2122 produces another shaped signal 2142 which is obtained by comparing and shaping the alternating signal 2101 by using the predetermined hysteresis width. The second comparator block 2120 comprises the resistors 2121 and 2122, a comparator 2123, and an inverting circuit 2124. The shaped signals 2141 and 2142 are supplied to a pulse generating block 2130. The pulse generating block 2130 comprises an inverting circuit 2131, an AND circuit 2132, and OR circuits 2133 and 2134. The pulse generating block 2130 outputs a pulse signal 2150, the level of which is changed during a time period from a leading edge of the shaped signal 2141 to that of the shaped signal 2142. As a result, the rotational speed of the motor can be measured on the basis of the pulse signal 2150.

However, in the conventional brushless motor, many detection parts and detection devices are required to attach to the rotor and the stator in order to generate the alternating signals. Consequently, the number of mechanical parts is large and the production of the motor is complicated. In particular, the optical disk 2002 having slits must be attached to the rotor, and the light emitting diode 2010 and the phototransistor 2011 must be attached to the stator. As a result, the conventional brushless motor has problems that the production cost is high and that the space for such parts is large.

In the conventional brushless motor, moreover, the pulse signal 2150 can be used for measurement of the rotational speed but cannot be used for detection of a rotational direction. In many applications for rotating the disk or the like, it is required also to detect the rotational direction. In the above-mentioned conventional configuration, some detection parts for detecting the rotational direction must be additionally disposed.

As the two comparator blocks 2110 and 2120 are used for shaping the same alternating signal 2101, the circuitry of the conventional brushless motor has a complex configuration. In order to simplify the circuitry, it may be contemplated that only the first comparator block 2110 having no hysteresis is used, and the second comparator block 2120 and the pulse generating block 2130 are omitted. However, since the first comparator block 2110 has no hysteresis, many noise pulses are generated at timings when the edges of the shaped signal 2141 are generated, by high-frequency noises contained in the alternating signal 2101. The pulse signal from the first comparator block 2110 cannot be used as the signal for measuring the rotational speed.

On the contrary, in order to simplify the circuitry, it may be contemplated that only the second comparator block 2120 having hysteresis is used, and the first comparator block 2110 and the pulse generating block 2130 are omitted. However, since the second comparator block 2120 has hysteresis, timings of the edges of the shaped signal 2142 are shifted from the respective zero-crossing points of the input alternating signal 2101 by a value corresponding to the hysteresis width. Both the pulse width and the pulse period of the shaped signal 2142 are varied by an amplitude modulation component contained in the alternating signal 2101. Therefore, the pulse signal of the second comparator block 2120 cannot be sufficiently as the signal for measuring the rotational speed.

Although the two comparator blocks are used in the conventional brushless motor, the output signal has noise pulses when the alternating signal 2101 contains noises larger than the hysteresis width of the second comparator block 2120. In mass production, there are large variations in the amplitude of the alternating signal 2101. Therefore, the hysteresis width must be set to a value sufficiently smaller than the estimated minimum amplitude in mass-produced motors, and the margin for noises is reduced remarkably.

BRIEF SUMMARY OF THE INVENTION

Briefly stated, the present invention comprises a brushless motor. The brushless motor includes a field means for generating a magnetic field flux by using a permanent magnet; plural-phase coils interlinking with the magnetic field flux; position detecting means for detecting the relative position between the field means and the coils and for obtaining plural-phase position signals which vary in a continuous manner; rotation detecting means for obtaining a rotation signal and a direction signal in correspondence with output signals of the position detecting means; command means for outputting an activation command signal; and drive means for supplying electric power to the coils in correspondence with the activation command signal and the corresponding position signals.

The rotation detecting means comprise a shaped position signal producing means for producing three-phase shaped position signals which are electrically different from each other in phase and are based upon three-phase output signals of the position detecting means; rotation signal producing means for obtaining the rotation signal which is synchronized with the shaped position signals; and direction signal producing means for obtaining the direction signal in response to a level of one of the shaped position signals coincident with a level change of the rotation signal.

In the brushless motor of the present invention, the three-phase shaped position signals, different from each other in phase, are produced by shaping the three-phase output signals of the position detecting means. The rotation signal is produced by using the shaped position signals, and the direction signal is produced in response to a level of one of the shaped position signals coincident with a level change of the rotation signal.

According to this configuration, because the position signals of the brushless motor are used, no additional parts are required. Furthermore, by using the three-phase shaped position signals, the rotation signal and the direction signal are hardly affected by noise contained in the three-phase output signals of the position detecting means.

The brushless motor of another aspect comprises field means for generating a magnetic field flux by using a permanent magnet; plural-phase coils interlinking with the magnetic field flux; position detecting means for detecting the relative position between the field means and the coils and for obtaining plural-phase position signals which vary in a continuous manner; rotation detecting means for obtaining a rotation signal and a direction signal in correspondence with output signals of the position detecting means; command means for outputting an activation command signal; and drive means for supplying electric power to the coils in correspondence with the activation command signal and to the corresponding position signals.

The rotation detecting means comprises shaped position signal producing means for producing three-phase shaped position signals A, B, and C which are electrically different from each other in phase based upon three-phase output signals of the position detecting means; rotation signal producing means for eliminating noises coincident with a level change of the rotation signal by using a pair of the shaped position signals A and B and for obtaining the rotation signal which is synchronized with either of the shaped position signals A and B, and direction signal producing means for obtaining the direction signal in correspondence with a level of the shaped position signal C coincident with a level change of the rotation signal.

In a specific brushless motor of the present invention, the rotation detecting means comprises the shaped position signal producing means, the rotation signal producing means and the direction signal producing means. The shaped position signal producing means waveform-shapes the three-phase output signals of the position detecting means, and produces the three-phase shaped position signals A, B, and C which are electrically different from each other in phase. The rotation signal producing means eliminates the noise coincident with the level change of the rotation signal by using the pair of shaped position signals A and B, and obtains the rotation signal synchronized with either of the shaped position signals A and B. The direction signal producing means obtains the direction signal in response to the level of the shaped position signal C coincident with a level change of the rotation signal.

According to this configuration, the rotation signal is produced from a pair of the shaped position signals A and B so as to eliminate the noise contained in the shaped position signal A or B, and for synchronizing the rotation signal with either of the shaped position signals A or B. Even when the shaped position signal A or B is produced by using comparators having no hysteresis, the rotation signal is not influenced by noise contained in the shaped position signals and a level change (edge) of the rotation signal occurring exactly at a zero-crossing point of the output signal of the position detecting means. Furthermore, the direction signal is obtained in response to the level of the shaped position signal C coincident with the level change of the rotation signal. In other words, the rotation signal does not contain noise pulses, and the level of the shaped position signal C is stable during the level change of the rotation signal resulting in stable detection of the direction signal.

The brushless motor of another aspect comprises a field means for generating a magnetic field flux by using a permanent magnet; plural-phase coils interlinking with the magnetic field flux; position detecting means for detecting the relative position between the field means and the coils and for obtaining plural-phase position signals which vary in a continuous manner; rotation detecting means for obtaining a rotation signal and a direction signal in correspondence with the output signals of the position detecting means; command means for outputting an activation command signal; and drive means for supplying electric power to the coils in correspondence with the activation command signal and the corresponding position signals.

The rotation detecting means comprises shaped position signal producing means for producing three-phase shaped position signals A, B, and C, which are electrically different from each other in phase, based upon three-phase output signals of the position detecting means; first rotation signal producing means for: (1) eliminating noises coincident with a level change of the first rotation signal by using a pair of the shaped position signals A and B, and (2) for obtaining the first rotation signal which is synchronized with either of the shaped position signals A and B; second rotation signal producing means for: (1) eliminating noise coincident with a level change of the second rotation signal by using another pair of the shaped position signals B and C, and (2) for obtaining the second rotation signal which is synchronized with either of the shaped position signals B and C; rotation signal output means for outputting the rotation signal in correspondence with at least one of the first and second rotation signals; and direction signal producing means for obtaining the direction signal in correspondence with the level of the second rotation signal coincident with a level change of the first rotation signal.

In another specific embodiment of the brushless motor of the present invention, the rotation detecting means comprises the shaped position signal producing means, the first rotation signal producing means, the second rotation signal producing means, the rotation signal output means, and the direction signal producing means. The shaped position signal producing means waveform-shapes the three phase output signals of the position detecting means, and produces the three-phase shaped position signals A, B, and C. The first rotation signal producing means eliminates the noise coincident with a level change of the first rotation signal by using the pair of the shaped position signals A and B, and obtains the first rotation signal synchronized with either of the shaped position of the shaped position signals A and B. The second rotation signal producing means eliminates the noise coincident with a level change of the second rotation signal by using another pair of the shaped position signals B and C, and obtains the second rotation signal synchronized with either of the shaped position signals B and C. The rotation signal output means outputs the first or second rotation signal as the rotation signal. The direction signal producing means obtains the direction signal in response to the level of the second rotation signal coincident with the level change of the first rotation signal.

According to this configuration, the rotation signal is produced from the pair of the shaped position signals A and B or B and C so as to eliminate the noise contained in the shaped position signals. As the first and second rotation signals do not contain noise pulses, the stable detection of the direction signal is always enabled.

The brushless motor of another aspect comprises field means for generating a magnetic field flux by using a permanent magnet; plural-phase coils interlinking with the magnetic field flux; position detecting means for detecting the relative position between the field means and the coils and for obtaining plural-phase position signals which vary in a continuous manner; rotation detecting means for obtaining a rotation signal and a direction signal in correspondence with the output signals of the position detecting means; command means for outputting an activation command signal; and drive means for supplying electric power to the coils in correspondence with the activation command signal corresponding to the position signals.

The rotation detecting means comprises shaped position signal producing means for producing three-phase shaped position signals A, B, and C which are electrically different from each other in phase, based upon three-phase output signals of the position detecting means; first rotation signal producing means for: (1) eliminating noise coincident with a level change of the first rotation signal by using a pair of the shaped position signals A and B, and (2) obtaining the first rotation signal which is synchronized with either of the shaped position signals A and B; second rotation signal producing means for eliminating noise coincident with a level change of the second rotation signal by using another pair of the shaped position signals B and C, and for obtaining the second rotation signal which is synchronized with either of the shaped position signals B and C; third rotation signal producing means for eliminating noise coincident with a level change of the third rotation signal by using another pair of the shaped position signals C and A, and for obtaining the third rotation signal which is synchronized with either of the shaped position signals C and A; rotation signal output means for synthesizing the first, second, and third rotation signals with each other, and for outputting a synthesized signal as the rotation signal; and direction signal producing means for obtaining the direction signal in correspondence with the level of the second rotation signal coincident with a level change of the first rotation signal.

In another specific embodiment of a brushless motor of the present invention, the rotation detecting means comprises the shaped position signal producing means, the first rotation signal producing means, the second rotation signal producing means, the third rotation signal producing means, the rotation signal output means, and the direction signal producing means. The shaped position signal producing means waveform-shapes the three-phase output signals of the position detecting means, and produces the three-phase shaped position signals A, B, and C. The first rotation signal producing means eliminates the noise coincident with the level change of the first rotation signal by using the pair of the shaped position signals A and B. The second rotation signal producing means eliminates the noise coincident with the level change of the second rotation signal by using another pair of the shaped position signals B and C, and the third rotation signal producing means eliminates the noise coincident with the level change of the third rotation signal by using another pair of the shaped position signals C and A. The rotation signal output means combines the first, second, and third rotation signals so as to output the rotation signal. The direction signal producing means obtains the direction signal in response to the level of the second rotation signal coincident with the level change of the first rotation signal.

According to this configuration, each of the first, second, and third rotation signals is produced by using a pair of the shaped position signals so as to eliminate the noise contained in the shaped position signals. The output rotation signal of the rotation signal output means has a frequency higher than that of the shaped position signals. As a result, the direction signal occurring in response to the level of the second rotation signal coincident with the level change of the first rotation signal is stably obtained.

A brushless motor which is used for rotating a disk, comprises field means for generating a magnetic field flux by using a permanent magnet; plural-phase coils interlinking with the magnetic field flux; position detecting means for detecting the relative position between the field means and the coils, and for obtaining plural-phase position signals which vary in a continuous manner; rotation detecting means for obtaining a rotation signal and a direction signal in correspondence with output signals of the position detecting means; command means for outputting a direction command signal and an activation command signal so as to produce a forward torque in a rotation command operation and a reverse direction in a stop command operation; drive means for supplying electric power to the coils in correspondence with the activation command signal corresponding to the position signals; and stop operation means for stopping rotation of the motor in correspondence with the direction command signal and the direction signal.

The rotation detecting means comprises shaped position signal producing means for producing plural-phase shaped position signals which are electrically different from each other in phase, based upon output signals of the position detecting means; rotation signal producing means for producing the rotation signal synchronized with the shaped position signals; and direction signal producing means for producing the direction signal in correspondence with a rotation of the field means by using the plural-phase shaped position signals.

The stop operation means comprises activation changing means for supplying the required electric power to the coils in correspondence with the activation command signal and the direction command signal when either the direction command signal indicates a forward rotation command or the direction signal indicates a forward rotation, and for stopping activation of the coils when the direction command signal indicates a reverse rotation and the direction signal indicates a reverse direction.

The stop operation means further includes: (1) stop detecting means for outputting a stop operation signal when the time interval of the rotation signal command signal becomes larger than a predetermined value in the stop command operation, and (2) unloading means for unloading the disk in response to the stop operation signal.

In the brushless motor of the present invention suitable for rotating the disk, the field means generates the magnetic field flux by using a permanent magnet. The plural-phase coils are disposed so as to interlink with the magnetic field flux. The position detecting means detects the relative position between the field means and the coils, and the position detecting means generates plural-phase continuously variable position signals. The rotation detecting means generates the rotation signal and the direction signal in response to the output signals of the position detecting means. The command means outputs the direction command signal and the activation command signal so as to produce the forward torque in the rotation command operation and so as to produce the reverse torque in the stop command operation. The drive means supplies the electric power to the coils in response to the activation command signal corresponding to the position signals. The stop operation means stops the motor rotation in accordance with the direction command signal and the direction signal. Furthermore, the rotation detecting means comprises the shaped position signal producing means, the rotation signal producing means, and the direction signal producing means. The shaped position signal producing means waveform-shapes the output signals of the position detecting means, and produces the plural-phase shaped position signals which are electrically different from each other in phase. The rotation signal producing means produces the rotation signal in synchronization with the rotation of the field means, by using the shaped position signals. The direction signal producing means produces the direction signal corresponding to the rotational direction of the field means, by using the plural-phase shaped position signals. The stop operation means comprises the activation changing means, the stop detecting means, and the unloading means. When the direction command signal indicates the forward rotation command or the direction signal indicates the forward rotation, the activation changing means allows the drive means to supply the coils with the required electric power in response to the activation command signal, so as to produce a forward torque or a reverse torque corresponding to the direction command signal. When the direction command signal indicates the reverse rotation command and the direction signal indicates the reverse rotation, the activation changing means stops the activation of the coils. After the time interval of the level change of the rotation signal becomes larger than a predetermined value, the stop detecting means outputs the stop operation signal. The unloading means unloads the disk in response to the stop operation signal.

According to this configuration, the accurate rotation signal and the correct direction signal used for measuring the rotation of the field means are produced by the output signals of the position detecting means. In the rotation command operation, the forward rotation of the motor is controlled by the rotation signal. When the operation of the motor is transferred from the rotation command operation to the stop command operation, the direction command signal is, at first, changed from the forward rotation command to the reverse rotation command. The motor produces a reverse torque corresponding to the direction command signal and reduces the rotational speed rapidly. The beginning of the reverse rotation of the motor is instantaneously detected by the change of the detection signal. The activation of the motor coils is stopped by the activation changing means as soon as the reverse rotation is detected. The stop detecting means confirms the stop of the rotation of the field means by the time interval of the rotation signal, and it outputs the stop operation signal. The unloading means unloads the disk in response to the stop operation signal. As a result, the disk is unloaded in a very short time period in response to the stop command operation, and damage of the disk due to the unloading operation is prevented because of the confirmation by the stop detecting means.

DETAILED DESCRIPTION OF THE INVENTION

Hereinafter, embodiments of the present invention will be described with reference to the accompanying drawings.

<<FIRST EMBODIMENT>>

Figure 1:
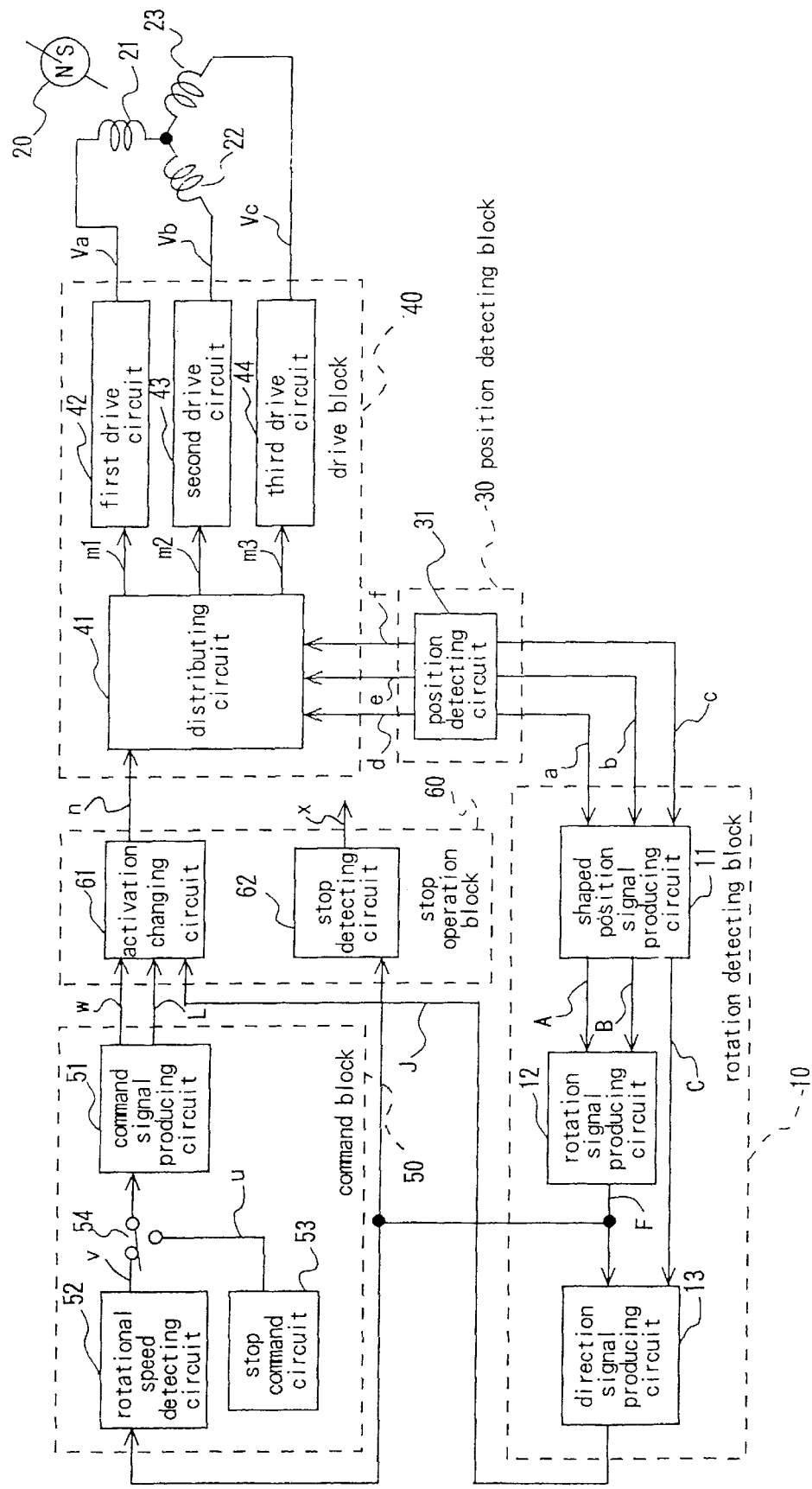
FIG. 1 is a block diagram showing an entire configuration of a brushless motor of a first embodiment of the present invention.

FIG. 1 through FIG. 8 show a brushless motor of a first embodiment of the present invention which is used for rotating a disk. FIG. 1 shows an entire configuration of the motor. A field part 20 shown in FIG. 1 is mounted on the rotor and forms plural magnetic field poles by a permanent magnet, thereby generating a magnetic field flux. Three-phase coils 21, 22, and 23 are mounted on the stator and arranged so as to be electrically separated from each other by a predetermined angle (corresponding to 120 degrees in an electrical angle) with respect to interlinkage with the magnetic flux of the field part 20. An electric power (a voltage or a current) is supplied in correspondence with the relative position between the field part 20 and the three-phase coils, thereby rotating the field part 20 and the disk attached to the rotor.

Figure 2:
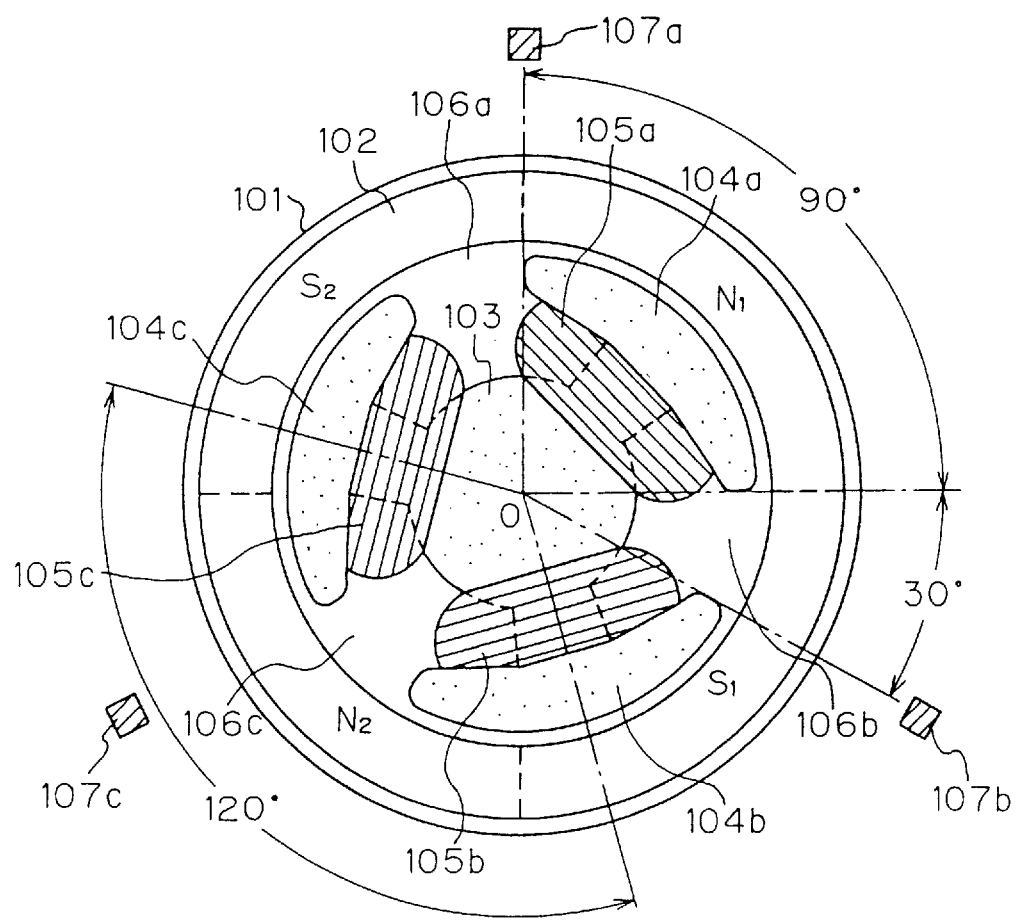
FIG. 2 is a cross-sectional view showing a configuration of the brushless motor of the first embodiment.

FIG. 2 specifically shows configurations of the field part 20 and the three-phase coils 21, 22, and 23. In an annular permanent magnet 102 attached to the inner side of the rotor 101, the inner and end faces are magnetized so as to form four poles, thereby constituting the field part 20 shown in FIG. 1. An armature core 103 is disposed at a position of the stator which opposes the poles of the permanent magnet 102. Three salient poles 104a, 104b, and 104c are disposed in the armature core 103 at intervals of 120 degrees in a mechanical angle. Three-phase coils 105a, 105b, and 105c (corresponding to the three-phase coils 21, 22, and 23 shown in FIG. 1) are wound on the salient poles 104a, 104b, and 104c in winding slots 106a, 106b, and 106c formed between the salient poles, respectively. Among the coils 105a, 105b, and 105c, phase differences of 120 degrees in the electrical angle are established with respect to the interlinkage with the magnetic flux from the permanent magnet 102 (the mechanical angle of one set of N and S poles corresponds to the electrical angle of 360 degrees). Three position detecting elements 107a, 107b, and 107c (for example, Hall elements which are magnetoelectrical converting elements) are arranged on the stator. The end face poles of the permanent magnet 102 are detected, thereby obtaining three-phase position signals corresponding to the relative position between the field part and the coils. In the embodiment, the coils and the position detecting elements are shifted in phase by the electrical angle of 90 degrees (45 degrees in the mechanical angle). When driving signals in the same phase with the detection signals of the position detecting elements are applied to the coils, a rotation force in a predetermined direction can be obtained continuously.

A position detecting circuit 31 of a position detecting block 30 shown in FIG. 1 detects the relative position between the field part 20 and the three-phase coils 21, 22, and 23, and outputs three-phase output signals which analoguely vary and are electrically different in phase from each other. In the embodiment, the position detecting circuit 31 outputs two sets of three-phase output signals a, b, and c and three-phase output signals d, e, and f. The three-phase output signals a, b, and c are supplied to a rotation detecting block 10, and the three-phase output signals d, e, and f are supplied to a drive block 40.

The rotation detecting block 10 of FIG. 1 comprises a shaped position signal producing circuit 11 connected to the position detecting circuit 31, a rotation signal producing circuit 12 connected to the shaped position signal producing circuit 11, and a direction signal producing circuit 13. The shaped position signal producing circuit 11 shapes the three-phase output signals a, b, and c of the position detecting block 30 and obtains three-phase shaped position signals A, B, and C. The rotation signal producing circuit 12 obtains a rotation signal F in which noises are eliminated, by using a pair of the shaped position signals A and B. The direction signal producing circuit 13 obtains a direction signal J in correspondence with a level of the shaped position signal C of the other phase at a timing of a level change of the rotation signal F (i.e., a timing when an edge of the rotation signal F is produced).

Figure 3:
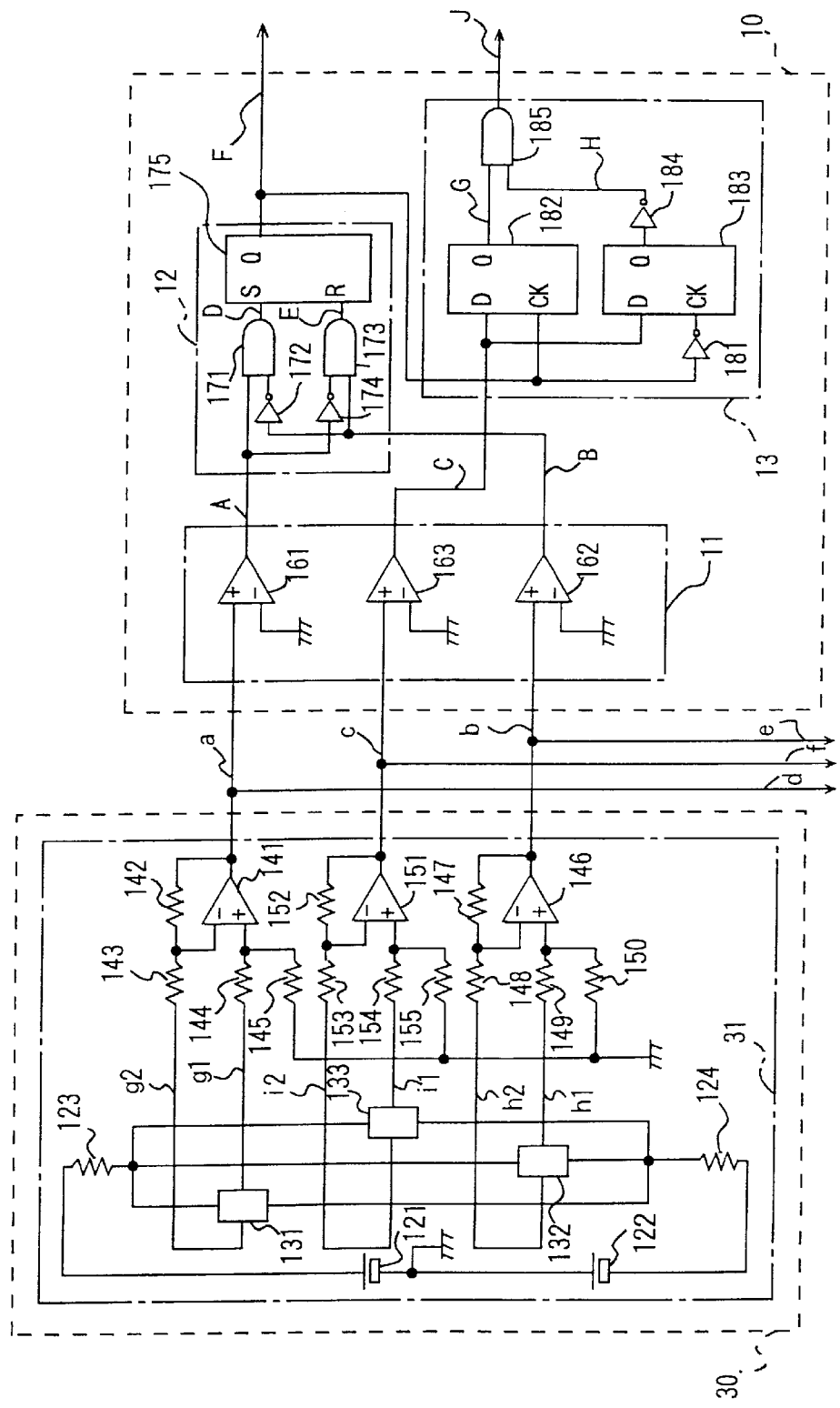
FIG. 3 is a circuit diagram showing configurations of a rotation detecting block 10 and a position detecting block 30 shown in FIG. 1.

FIG. 3 specifically shows configurations of the position detecting circuit 31 of the position detecting block 30, and the shaped position signal producing circuit 11, the rotation signal producing circuit 12, and the direction signal producing circuit 13 in the rotation detecting block 10. Position detecting elements 131, 132, and 133 in the position detecting circuit 31 correspond to the position detecting elements 107a, 107b, and 107c shown in FIG. 2. DC voltages (+Vcc and −Vcc: Vcc=+5 V, −Vcc=−5 V) of DC power sources 121 and 122 are applied to the position detecting elements 131, 132, and 133 via resistors 123 and 124. Differential position signals g1 and g2 corresponding to the detected magnetic field of the field part 20 (corresponding to the permanent magnet 102 of FIG. 2) are detected at output terminals of the position detecting element 131. The position signals g1 and g2 are differentially amplified by an operational amplifier circuit 141 and resistors 142, 143, 144, and 145, and the output signal a of a first phase which analoguely varies in the same phase with the position signal g1 is output. Similarly, differential position signals h1 and h2 corresponding to the detected magnetic field of the field part 20 are output at output terminals of the position detecting element 132. The position signals h1 and h2 are differentially amplified by an operational amplifier circuit 146 and resistors 147, 148, 149, and 150, and the output signal b of a second phase is obtained. Furthermore, differential position signals i1 and i2 corresponding to the detected magnetic field of the field part 20 are output at output terminals of the position detecting element 133. The position signals i1 and i2 are differentially amplified by an operational amplifier circuit 151 and resistors 152, 153, 154, and 155 and the output signal c of a third phase is output. The output signals d, e, and f of the position detecting circuit 31 coincide with the output signals a, b, and c, respectively, and are supplied to the drive block 40. As the rotational movement of the field part 20 proceeds, the output signals a, b, and c and the output signals d, e, and f of the position detecting circuit 31 vary analoguely so as to constitute two sets of three-phase signals which have a desired electrical phase difference. The position signals g1, g2, h1, h2, and i1, and i2 constitute six phases in total, and the signals g1 and g2, h1 and h2, or i1 and i2 are in reversed phase relationships. In the embodiment, the signals of reversed phase relationships are not counted in the number of phases. Consequently, the six position signals obtained from the three position detecting elements 131, 132, and 133 constitute three-phase signals.

The shaped position signal producing circuit 11 of the rotation detecting block 10 is configured by three comparators 161, 162, and 163. The comparator 161 outputs the shaped position signal A by shaping the output signal a of the position detecting circuit 31. Similarly, the comparator 162 outputs the shaped position signal B by shaping the output signal b, and the comparator 163 outputs the shaped position signal C by shaping the output signal c.

Figure 4:
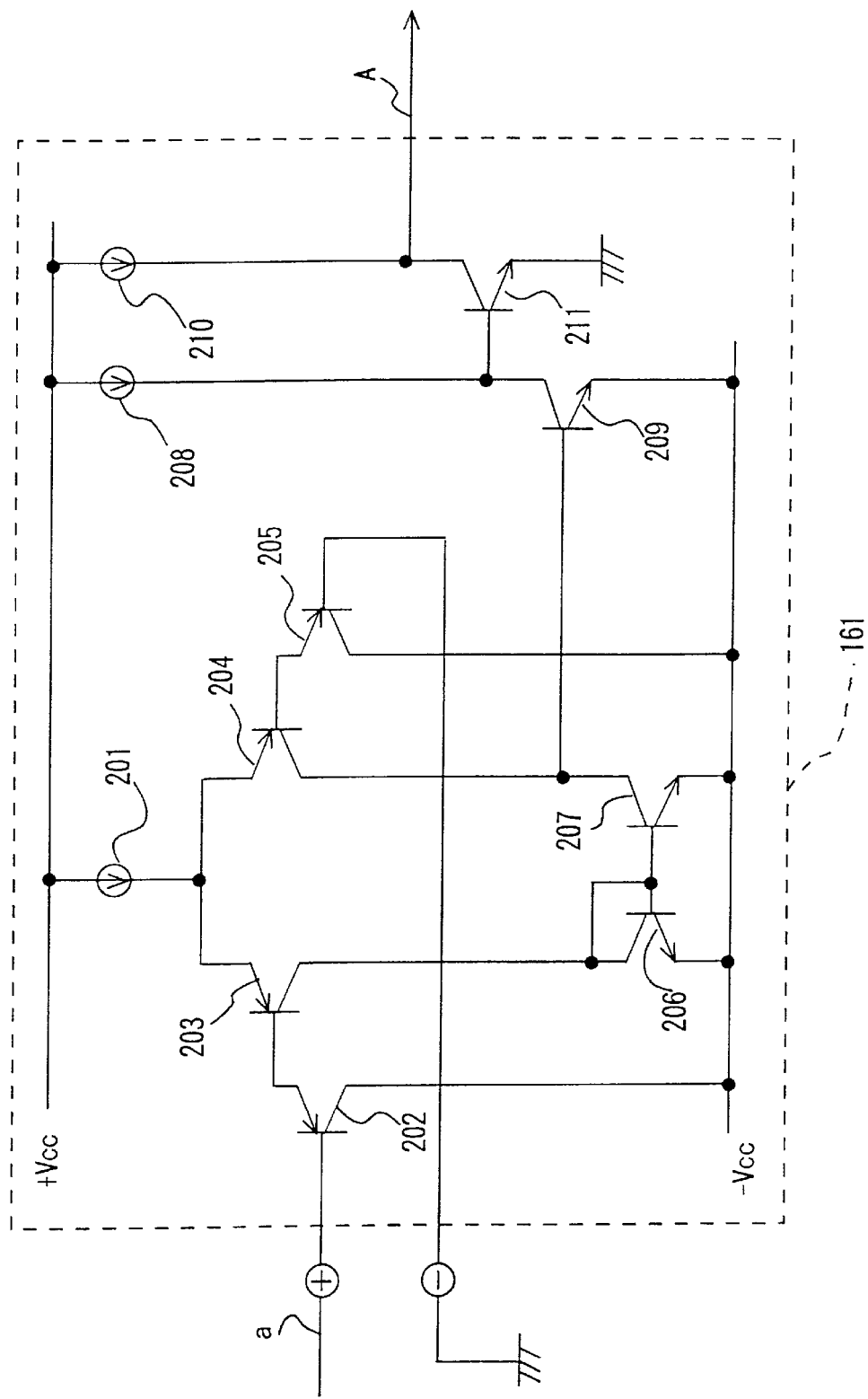
FIG. 4 is a circuit diagram showing a configuration of a comparator 161 shown in FIG. 3.

FIG. 4 shows a concrete configuration of the comparator 161. Transistors 202, 203, 204, 205, 206, and 207 compare the analog output signal a with a predetermined voltage (in the embodiment, the ground potential). When the output signal a is higher than the predetermined voltage, a transistor 209 is turned on and a transistor 211 is turned off. As a result, the shaped position signal A of the comparator 161 becomes "H" (the high-potential state, and, in the embodiment, Vcc). By contrast, when the output signal a is lower than the predetermined voltage, the transistor 209 is turned off and the transistor 211 is turned on. As a result, the shaped position signal A of the comparator 161 becomes "L" (the low-potential state, and, in the embodiment, the ground potential). Constant current sources 201, 208, and 210 supplies currents of a predetermined value. In this way, the comparator 161 compares the output signal a of the position detecting circuit 31 with the predetermined voltage without setting hysteresis, and changes the level of the shaped position signal A to "H" or "L" in a digital manner at the zero-crossing point of the output signal a of the position detecting circuit 31. The comparators 162 and 163 operate in the same manner, and change the levels of the shaped position signals B and C to "H" or "L" in a digital manner at the respective zero-crossing points of the output signals b and c of the position detecting circuit 31, respectively.

The rotation signal producing circuit 12 in the rotation detecting block 10 of FIG. 3 receives a pair of the shaped position signals A and B. In the rotation signal producing circuit 12, an inverting circuit 172 and an AND circuit 171 produce an AND signal D of a negation of the signal B and the signal A, and the AND signal D is supplied to the set terminal of a set-reset flip-flop circuit 175. An inverting circuit 174 and an AND circuit 173 produce an AND signal E of the negation of the signal A and the signal B, and the AND signal is supplied to the reset terminal of the flip-flop circuit 175. As a result, the digital rotation signal F synchronized with the shaped position signal A or B is obtained at the output terminal of the flip-flop circuit 175.

The direction signal producing circuit 13 in the rotation detecting block 10 of FIG. 3 has a first flip-flop circuit 182 and a second flip-flop circuit 183. The first flip-flop circuit 182 latches a level of the shaped position signal C by using a leading edge (a timing when a level of the rotation signal F is changed from "L" to "H") of the rotation signal F as a clock signal, and outputs a first direction signal G. The second flip-flop circuit 183 latches the level of the shaped position signal C by using a falling edge (the timing when the level of the rotation signal F is changed from "H" to "L") of the rotation signal F as the clock signal, and outputs a second direction signal H via an inverting circuit 184. An AND circuit 185 functioning as a direction signal output circuit composes the first and second direction signals G and H to produce a direction signal J.

The operation of the rotation detecting block 10 of FIG. 3 will be described in detail with reference to FIGS. 9A through 9M. The abscissae of FIGS. 9A through 9M indicate the time. In FIGS. 9A through 9M, the forward rotation state is carried out in the left side of the one-dot chain line, and the state is changed to the reverse rotation state at the one-dot chain line. In the forward rotation state, the output signals a, b, and c of the position detecting block 30 change as three-phase analog signals which are electrically different in phase from each other [see FIGS. 9A to 9C]. In the shaped position signal producing circuit 11 of the rotation detecting block 10, the waveforms of the output signals a, b, and c are shaped by the comparators 161, 162, and 163, respectively, and the shaped position signals A, B, and C are produced. As the comparator 161 has a simple configuration having no hysteresis, the timing (the edge timing) of a level change of the shaped position signal A corresponds exactly to the zero-crossing point of the output signal a. When the output signal a has noises, minute noise pulses are generated in the shaped position signal A [see FIG. 9D]. Similarly, as the comparator 162 has no hysteresis, the timing of a level change of the shaped position signal B corresponds to the zero-crossing point of the output signal b. When the output signal b has noises, minute noise pulses are generated in the shaped position signal B [see FIG. 9E]. Furthermore, as the comparator 163 has no hysteresis, the timing of a level change of the shaped position signal C corresponds to the zero-crossing point of the output signal c. When the output signal c has noises, minute noise pulses are generated in the shaped position signal C [see FIG. 9F]. In the rotation signal producing circuit 12, the AND signal D [see FIG. 9G] and the AND signal E [see FIG. 9H] are produced by using a pair of the shaped position signals A and B, and the AND signals D and E are used as the set signal and the reset signal, respectively. As a result, the flip-flop circuit 175 outputs the rotation signal F in which the noises are eliminated [see FIG. 9I]. The rotation signal F is synchronized with the shaped position signal A during the forward rotation, and the level change of the rotation signal F is generated at the timing of a level change of the shaped position signal A. As a result, the rotation signal F has a waveform which is in phase with the shaped position signal A. The rotation signal F is synchronized with the shaped position signal B during the reverse rotation.

Figure 9:
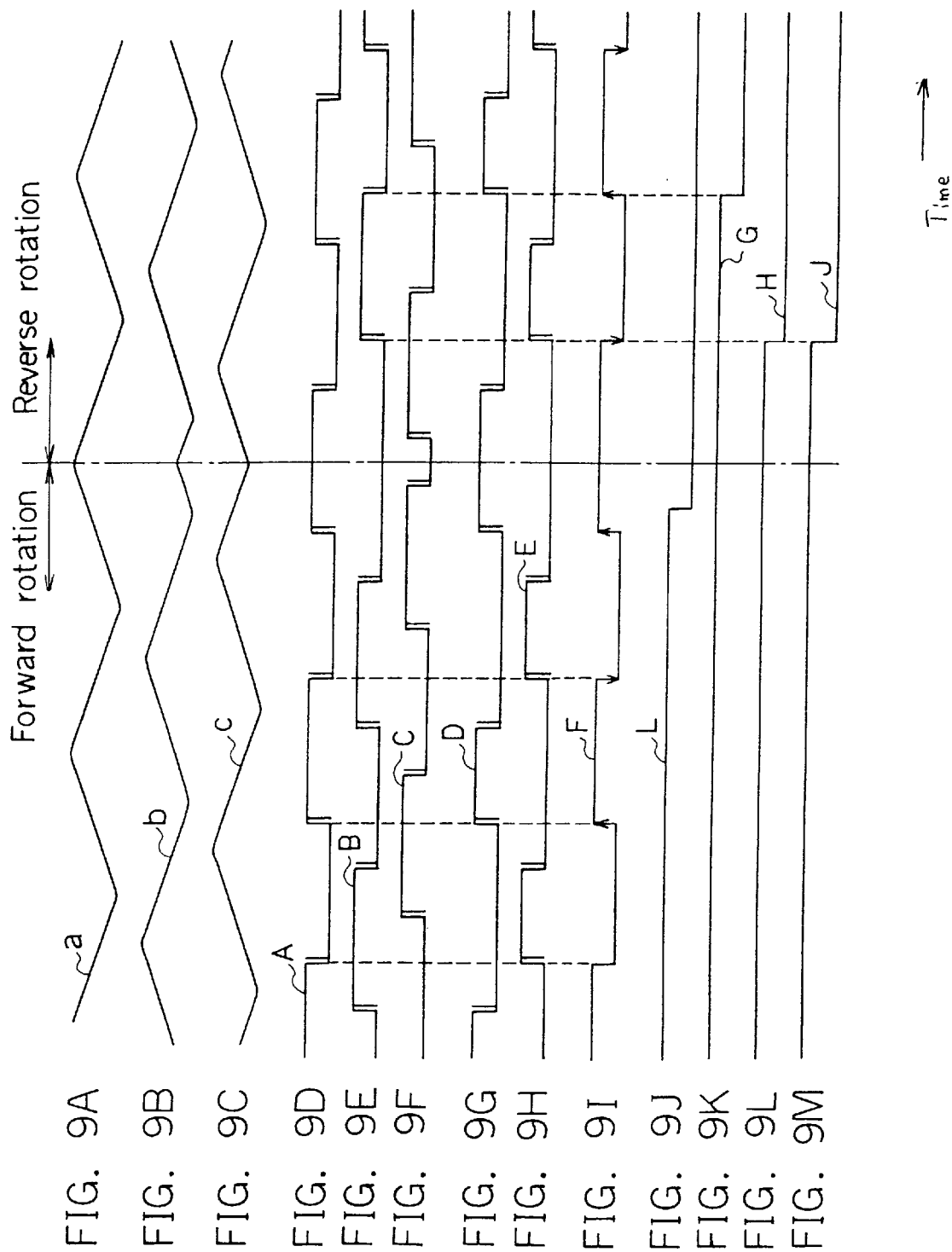
FIG. 9A is a waveform chart showing a waveform of an output signal a output from a position detecting circuit shown in FIG. 1.
FIG. 9B is a waveform chart showing a waveform of an output signal b output from the position detecting circuit shown in FIG. 1.
FIG. 9C is a waveform chart showing a waveform of an output signal c output from the position detecting circuit shown in FIG. 1.
FIG. 9D is a waveform chart showing a waveform of a shaped position signal A output from a shaped position signal producing circuit shown in FIG. 1.
FIG. 9E is a waveform chart showing a waveform of a shaped position signal B output from the shaped position signal producing circuit shown in FIG. 1.
FIG. 9F is a waveform chart showing a waveform of a shaped position signal C output from the shaped position signal producing circuit shown in FIG. 1.
FIG. 9G is a waveform chart showing a waveform of an AND signal D output from an AND circuit shown in FIG. 3.
FIG. 9H is a waveform chart showing a waveform of an AND signal E output from an AND circuit shown in FIG. 3.
FIG. 9I is a waveform chart showing a waveform of a rotation signal F output from a rotation signal producing circuit shown in FIG. 1.
FIG. 9J is a waveform chart showing a waveform of a direction command signal L output from a command signal producing circuit shown in FIG. 1.
FIG. 9K is a waveform chart showing a waveform of a first direction signal G output from a first flip-flop circuit shown in FIG. 3.
FIG. 9L is a waveform chart showing a waveform of a second direction signal H output from a second flip-flop circuit shown in FIG. 3.
FIG. 9M is a waveform chart showing a waveform of a direction signal J output from a direction signal producing circuit shown in FIG. 1.

The first flip-flop circuit 182 of the direction signal producing circuit 13 receives the shaped position signal C and holds the level of the shaped position signal C at the timing of the leading edge of the rotation signal F, and the first direction signal G is obtained [see FIG. 9K]. As a result, the first direction signal G is "H" during the forward rotation, and the first direction signal G is changed to "L" at a first timing of the leading edge of the rotation signal F in the reverse rotation. Similarly, the second flip-flop circuit 183 receives the shaped position signal C and holds the level of the shaped position signal C at the timing of the falling edge of the rotation signal F, and obtains the second direction signal H is obtained via the inverting circuit 184 [see FIG. 9L]. As a result, the second direction signal H is "H" during the forward rotation, and the second direction signal H is changed to "L" at a first timing of the falling edge of the rotation signal F in the reverse rotation. Therefore, the direction signal J in correspondence with the first and second direction signals G and H is "H" during the forward rotation, and the direction signal J is changed to "L" at a first timing of the edge of the rotation signal F in the reverse rotation [see FIG. 9M]. FIG. 9J shows a waveform of a direction command signal L which will be described later. When the direction command signal L is changed from the forward rotation command ("H" level) to the reverse rotation command ("L" level), the reverse direction torque is generated by the motor operation which will be described later, thereby decelerating the motor and then causing the motor to be reversely rotated (actually, the time period of the reverse rotation is short).

The drive block 40 of FIG. 1 comprises a distributing circuit 41, a first drive circuit 42, a second drive circuit 43, and a third drive circuit 44.

Figure 5:
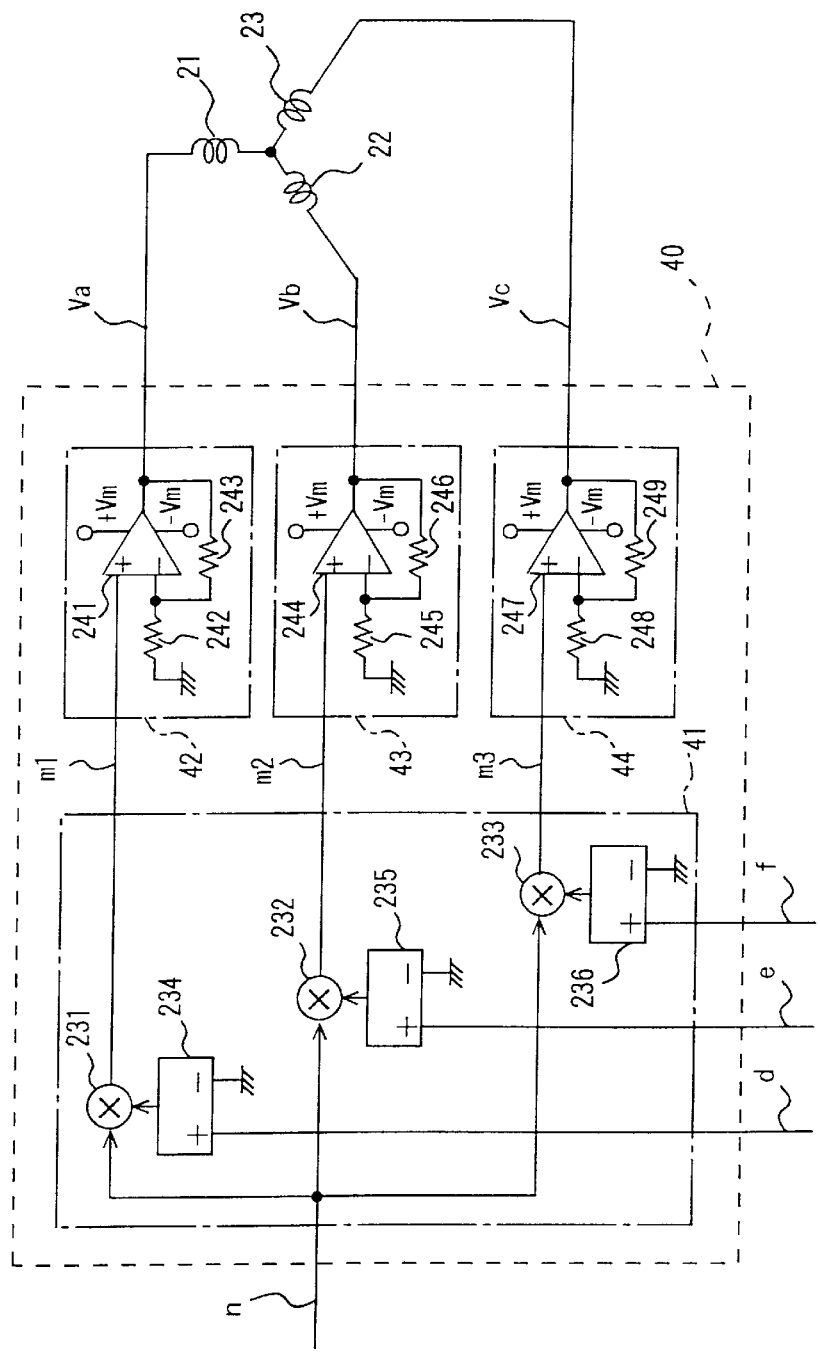
FIG. 5 is a circuit diagram showing a configuration of a drive block 40 shown in FIG. 1.

FIG. 5 shows a configuration of the drive block 40. The distributing circuit 41 of the drive block 40 receives the three-phase output signals d, e, and f of the position detecting block 30. Differential amplifier circuits 234, 235, and 236 amplify the difference voltages between the output signals d, e, and f and a predetermined voltage signal (in the embodiment, the ground potential) and output the amplified voltages. A corrected activation command signal n in correspondence with an activation command signal w of a command block 50 is supplied to the distributing circuit 41 (the corrected activation command signal n will be described in detail later). Multiplier circuits 231, 232, and 233 multiply the output signals of the differential amplifier circuits 234, 235, and 236 with the corrected activation command signal n, and output distributed signals m1, m2, and m3, respectively. The first drive circuit 42 supplies a driving voltage Va to the terminal of the coil 21 by power-amplifying the distributed signal m1. The second drive circuit 43 supplies a driving voltage Vb to the terminal of the coil 22 by power-amplifying the distributed signal m2. The third drive circuit 44 supplies a driving voltage Vc to the terminal of the coil 23 by power-amplifying the distributed signal m3. As a result, the driving voltages Va, Vb, and Vc distributed by the output signals d, e, and f of the position detecting circuit 31 are supplied to the three-phase coils 21, 22, and 23, respectively. The electric power (a voltage or a current) supplied to the coils 21, 22, and 23 is controlled in correspondence with the corrected activation command signal n (i.e., the activation command signal w). As the output signals d, e, and f of the position detecting block 30 are changed according to the rotation of the field part 20, a continuous torque is obtained.

In the embodiment, a forward torque is generated when the corrected activation command signal n is positive, and a reverse torque is generated when the corrected activation command signal n is negative.

Furthermore, when the corrected activation command signal n is zero, the generated torque becomes zero so that the activation of the coils is stopped.

The command block 50 of FIG. 1 comprises a command signal producing circuit 51, a rotational speed detecting circuit 52, a stop command circuit 53, and a switch circuit 54. The rotational speed detecting circuit 52 measures a time interval (the period or the half period) of the level change of the rotation signal F of the rotation detecting block 10, and changes analoguely the output signal (control signal) v of the rotational speed detecting circuit 52 in correspondence with the measurement result. That is, when the rotational speed is low, the control signal v of the rotational speed detecting circuit 52 has the positive maximum voltage, and, when the rotational speed is nearly equal to a predetermined rotational speed, the control signal v has a required positive voltage in correspondence with the rotational speed. In the case of the forward rotation command operation, the switch circuit 54 is connected so that the control signal v of the rotational speed detecting circuit 52 is supplied to the command signal producing circuit 51. In the case of the stop command operation, the switch circuit 54 is connected so that an output voltage signal (stop command signal) u of the stop command circuit 53 is supplied to the command signal producing circuit 51.

Figure 6:
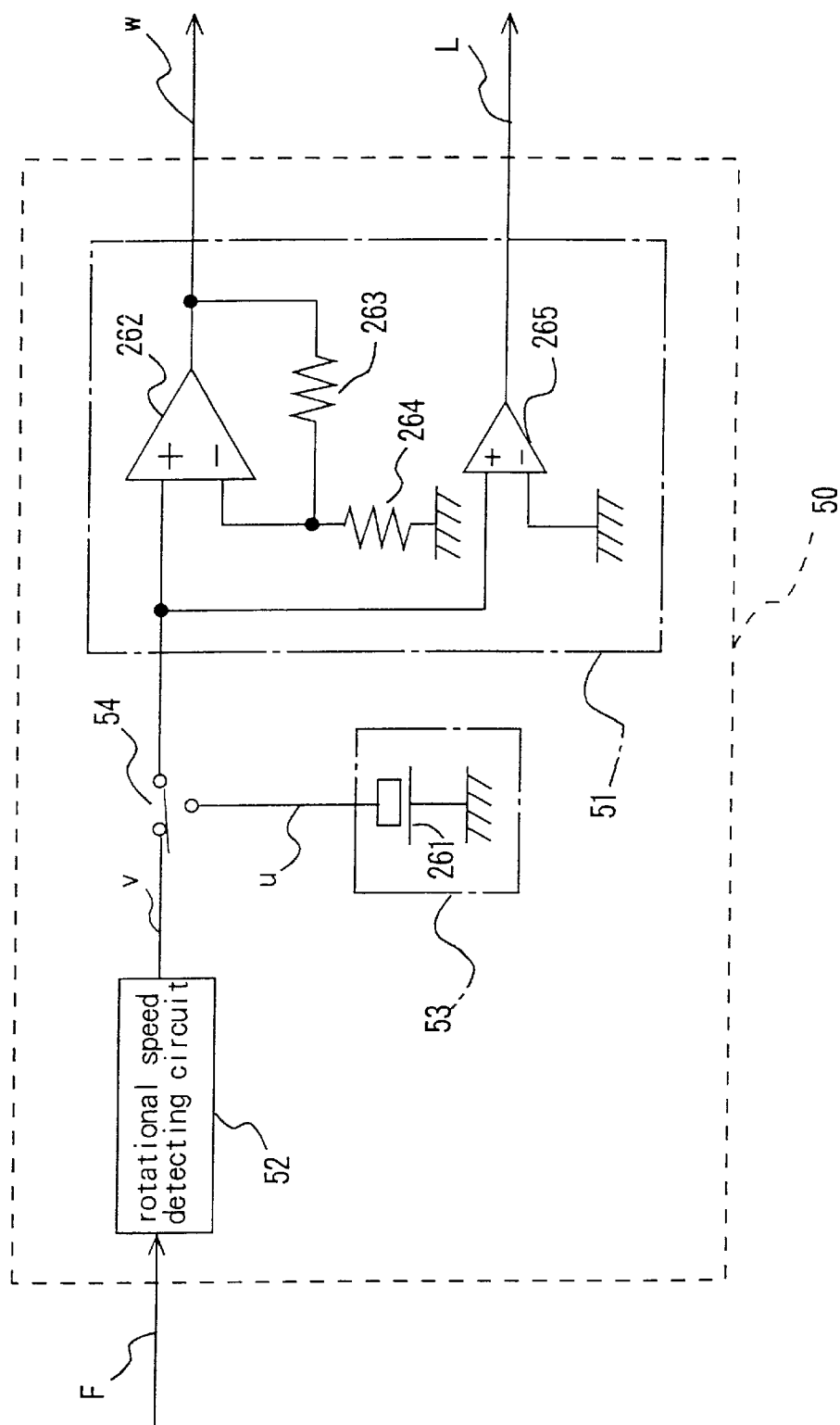
FIG. 6 is a circuit diagram showing a configuration of a command block 50 shown in FIG. 1.

FIG. 6 shows a configuration of the command block 50. The command signal producing circuit 51 amplifies the signal passed through the switch circuit 54 by a non-inverting amplifier circuit 262 and resistors 263 and 264, and it outputs the activation command signal w. A comparator 265 of the command signal producing circuit 51 compares the voltage signal from the switch circuit 54 with a predetermined voltage (in the embodiment, the ground potential), and outputs the direction command signal L. For example, the comparator 265 may have the circuitry shown in FIG. 4. The direction command signal L is "H" level in the case of the forward rotation command, and the signal is "L" level in the case of the reverse rotation command. The stop command circuit 53 has a voltage source 261 and outputs the stop command signal u which has a predetermined negative voltage. In the case of the stop command operation, as the connection of the switch circuit 54 is changed so as to pass the stop command signal u of the stop command circuit 53, the activation command signal w of the command signal producing circuit 51 becomes a negative voltage corresponding to the stop command signal u, and the direction command signal L is changed to "L" level which is the reverse rotation command. In the case of the forward rotation command operation, the switch circuit 54 operates so as to pass the control signal v of the rotational speed detecting circuit 52, and each of the activation command signal w and the direction command signal L of the command signal producing circuit 51 have a value in correspondence with the control signal v, thereby controlling the rotational speed of the motor.

Figure 7:
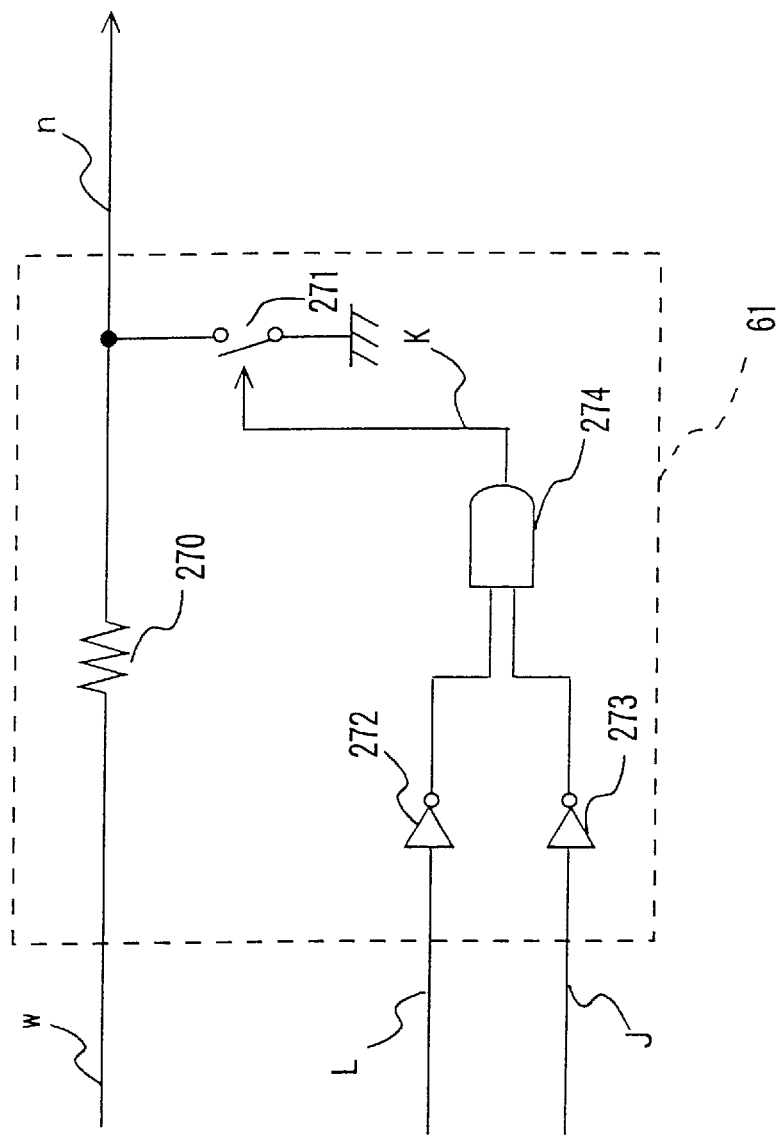
FIG. 7 is a circuit diagram showing a configuration of an activation changing circuit 61 shown in FIG. 1.

A stop operation block 60 of FIG. 1 comprises an activation changing circuit 61 and a stop detecting circuit 62. FIG. 7 shows a configuration of the activation changing circuit 61. The activation changing circuit 61 receives the activation command signal w and the direction command signal L of the command signal producing block 50, and also the direction signal J of the rotation detecting block 10. When the direction command signal L indicates the forward rotation command (L="H") or the direction signal J indicates the forward rotation (J="H"), the output signal (activation changing signal) K of an AND circuit 274 becomes "L", thereby turning off a switch circuit 271. As a result, the activation command signal w is output as the corrected activation command signal n. That is, the corrected activation command signal n coincides with the activation command signal w and the normal activation of the coils is conducted. When the direction command signal L indicates the reverse rotation command (L="L") and the direction signal J indicates the reverse rotation (J="L"), the activation changing signal K of the AND circuit 274 becomes "H", thereby turning on the switch circuit 271. As a result, the activation command signal w is interrupted by the resistor 270 and the switch circuit 271, so that the corrected activation command signal n becomes zero. When the corrected activation command signal n becomes zero, the drive block 40 operates so as to stop the activation of the three-phase coils 21, 22, and 23. In this embodiment, the driving voltages Va, Vb, and Vc have the same potential and no current flows through the coils 21, 22, and 23. That is, the activation of the coils 21, 22, and 23 is halted, and the rotation of the motor is stopped. The stop detecting circuit 62 of the stop operation block 60 of FIG. 1 receives the rotation signal F of the rotation detecting block 10. When it is detected that the interval of the level change of the rotation signal F becomes larger than a predetermined value, the stop detecting circuit 62 judges that the stop state is established and outputs a stop operation signal X, thereby causing the operation of unloading or ejecting the disk as described later.

Figure 8:
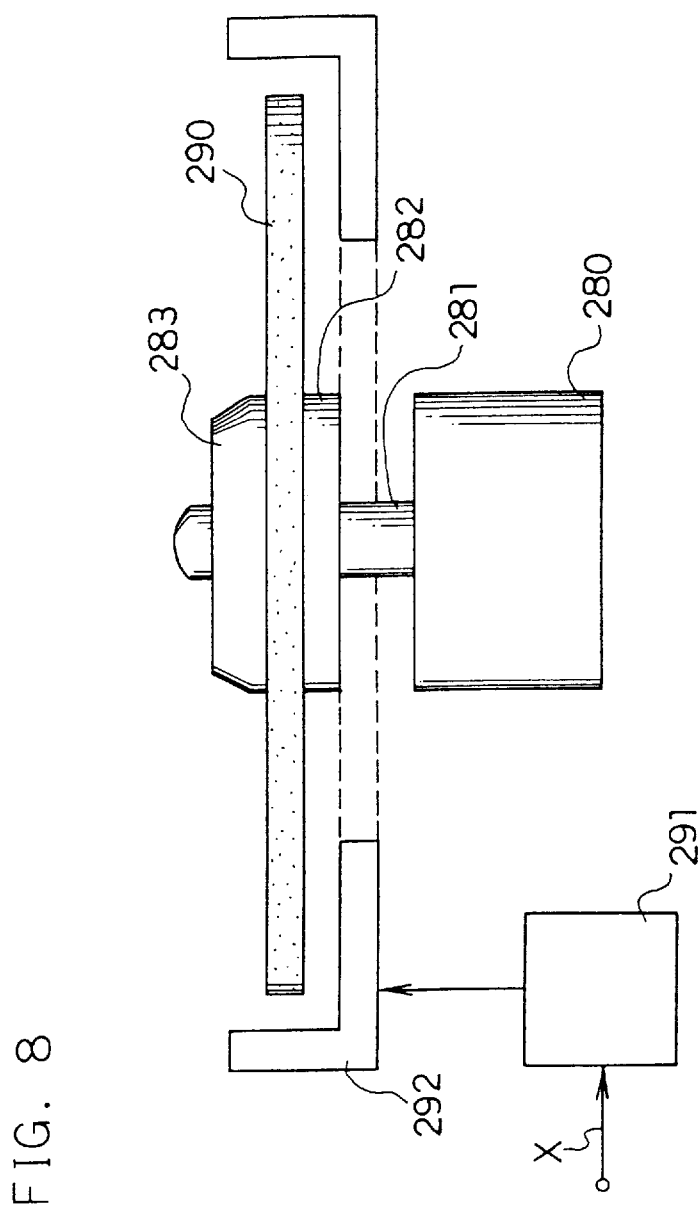
FIG. 8 is an explanatory view showing a configuration for rotating a disk in the brushless motor of the first embodiment.

FIG. 8 shows a configuration for rotating the disk. A rotation shaft 281 and a turn table 282 are attached to the rotor 282 (corresponding to the field part 20 of FIG. 1) of a motor part 280. As required, the disk 290 on which information has been recorded is slightly pressed against the turn table 282 by a damper 283 so as to contact therewith. The disk 290 is rotated together with the rotor field part of the motor part 280. When the disk 290 is rotated by the motor part 280, digital information is recorded onto or reproduced from the disk 290 by an optical pickup (not shown). When the disk 290 is to be ejected in order to replace the disk with another one, the motor part 280 is transferred from the rotation command operation to the stop command operation. Specifically, the stop command signal u of the stop command circuit 53 is supplied to the command signal producing circuit 51, and the activation command signal w and the direction command signal L are adjusted to indicate the reverse rotation command. The drive block 40 distributively supplies a reverse rotation driving signal to the coils 21, 22, and 23 so as to decelerate rapidly the field part 20. The activation changing circuit 61 detects the reverse rotation of the field part 20 by the polarity of the direction signal J of the rotation detecting block 10, and then stops the activation of the coils 21, 22, and 23 as soon as the direction signal J becomes the reverse rotation. Immediately after the stop of the activation, the field part 20 and the disk 290 remain to be rotated reversely at a low speed. Therefore, the stop detecting circuit 62 checks the rotation signal F of the rotation detecting block 10. When there occurs no level change of the rotation signal F over the predetermined period, the stop operation signal X is changed from "L" level to "H" level. In response to the level change of the stop operation signal X, an ejection driving block 291 starts to operate. Thereby, an ejection part 292 is moved and the disk 290 is detached from the turn table 282. Then, the disk 290 is moved to a predetermined unloading position (ejection position). In this way, the operation of unloading or ejecting the disk 290 is conducted after the stop of the rotation of the field part 20 is detected and confirmed. Consequently, as the unloading operation is not conducted while the disk 290 is rotated, a damage of the disk 290 due to the unloading operation can be prevented.

Next, the operation of the embodiment will be described. When the disk 290 is mounted as shown in FIG. 8, the motor part 280 rotates the turn table 282 and the disk 290 at a predetermined rotational speed in order to reproduce information recorded on the disk 290 or record information onto the disk 290. For this purpose, the switch circuit 54 of the command block 50 of FIG. 1 is connected to the rotational speed detecting circuit 52. The rotational speed detecting circuit 52 measures the rotational speed on the basis of the period or the half period of the rotation signal F of the rotation detecting block 10, and outputs the control signal v. The command signal producing circuit 51 outputs the activation command signal w and the direction command signal L in correspondence with the control signal v. During the speed control operation, the activation command signal w is a signal for generating a forward torque, and the direction command signal L indicates the forward rotation command (L="H"). Therefore, the activation changing circuit 61 and the stop detecting circuit 62 in the stop operation block 60 exert no effective operation. In other words, the corrected activation command signal n coincides with the activation command signal w. The position detecting circuit 31 of the position detecting block 30 detects the relative position between the field part 20 and the three-phase coils 21, 22, and 23, and outputs the three-phase output signals d, e, and f and the three-phase output signals a, b, and c which are electrically different from each other in phase. The distributing circuit 41, the first drive circuit 42, the second drive circuit 43, and the third drive circuit 44 in the drive block 40 distributes the electric power in correspondence with the activation command signal w to the three-phase coils 21, 22, and 23 corresponding to the output signals d, e, and f of the position detecting circuit 31. As a result, a forward torque for maintaining the forward rotation at the predetermined rotational speed is generated. On the other hand, the shaped position signal producing circuit 11 of the rotation detecting block 10 waveform-shapes the three-phase output signals a, b, and c of the position detecting circuit 31, and produces the three-phase shaped position signals A, B, and C which are electrically different from each other in phase. The rotation signal producing circuit 12 eliminates the noises by using a pair of the shaped position signals A and B, and produces the rotation signal F synchronized with the shaped position signal A or B. In the embodiment, the rotation signal F coincides with the shaped position signal A during the forward rotation, and the rotation signal F coincides with the shaped position signal B during the reverse rotation. The direction signal producing circuit 13 produces the direction signal J in correspondence with the level of the shaped position signal C at one kind or both kinds of the timings of level change (i.e., at least one of the leading edge and the falling edge) of the rotation signal F. In this way, the disk 290 is rotated in the forward rotation direction at the predetermined speed.

When the disk 290 is to be ejected, the connection of the switch circuit 54 in the command block 50 of FIG. 1 is changed to the stop command circuit 53. The stop command signal u (the predetermined negative voltage) is supplied to the command signal producing circuit 51 from the stop command circuit 53. Consequently, the activation command signal w of the command signal producing circuit 51 has the predetermined negative voltage, and the direction command signal L indicates the reverse rotation command (L="L"). At this time, the disk 290 and the field part 20 continue to rotate in the forward direction by inertia. The level of the rotation signal F is changed at the period corresponding to the rotational speed, and the direction signal J remains to indicate the forward rotation (J="H"). As a result, under this state, the stop operation block 60 exerts no effective operation. In other words, the corrected activation command signal n coincides with the activation command signal w. The distributing circuit 41, the first drive circuit 42, the second drive circuit 43, and the third drive circuit 44 in the drive block 40 distributes the electric power in correspondence with the activation command signal w to the three-phase coils 21, 22, and 23 corresponding to the output signals a, b, and c of the position detecting circuit 31. As a result, a reverse torque for the reverse rotation is generated. The disk 290 and the field part 20 are rapidly decelerated by the reverse torque, and finally start to rotate in the reverse direction. When the disk 290 and the field part 20 reversely rotate, the rotation detecting block 10 detects the beginning of the reverse rotation, and changes the direction signal J so as to indicate the reverse rotation (J="L"). When the direction command signal L indicates the reverse rotation command and the direction signal J is changed to indicate the reverse rotation, the activation changing circuit 61 operates so as to make the corrected activation command signal n zero (the ground potential). As a result, the activation of the threephase coils 21, 22, and 23 is stopped, and the driving torque is not generated. However, the disk 290 and the field part 20 are caused to continue to rotate in the reverse direction by inertia, and a certain period must elapse until they stop completely. The stop detecting circuit 62 measures the time interval of the level change of the rotation signal F. When there occurs no level change over the predetermined period, the stop detecting circuit 62 judges that the disk 290 stops, and changes the stop operation signal X from "L" to "H." When the stop operation signal X is changed to "H," the ejection driving block 291 and the ejection part 292 operate to conduct the unloading operation (ejection operation) on the disk 290.

In the brushless motor of the embodiment, the rotation signal for measuring the rotational speed and the direction signal for measuring the rotational direction are produced by using the position signals obtained by the position detecting elements of the brushless motor. Therefore, it is entirely unnecessary to add further parts to the structure of the motor. Accordingly, a simple motor configuration can be realized.

In the rotation detecting block, the noises at the timing of level change of the rotation signal are eliminated by using the two-phase shaped position signals. Therefore, an erroneous operation does not occur in the rotational speed measurement using the rotation signal. As the direction signal is obtained in correspondence with the level of the shaped position signal of the third phase at the timing of a level change of the rotation signal, the level of the shaped position signal of the third phase becomes stable at the timing of a level change of the rotation signal, and it is possible to obtain the direction signal correctly. In particular, even when the shaped position signals A, B, and C contain the noises at each edge, it is possible to obtain the rotation signal F and the direction signal J from which the noises are completely eliminated.

The rotation signal producing circuit comprises the flip-flop circuit in which the AND signal of the shaped position signal A and the negation of the shaped position signal B is supplied to the set terminal and the AND signal of the shaped position signal B and the negation of the shaped position signal A is supplied to the reset terminal. The rotation signal F is obtained from the output terminal of the flip-flop circuit. Therefore, the rotation signal F which is free from the noises can be easily produced by a very simple configuration.

When the position signal of the position detecting circuit (or an output signal which is in the same phase with the position signal) is waveform-shaped by the comparator having no hysteresis to obtain the shaped position signal A, it is possible to use the comparator which is very simply configured. Furthermore, the effect of the amplitude modulation component contained in the position signal can be eliminated, and hence the period or half period of the rotation signal is not disturbed by the amplitude modulation. In other words, it is possible to obtain the rotation signal for measuring the rotational speed correctly.

The direction signal producing circuit comprises the edge-trigger type flip-flop circuit which receives the level of the shaped position signal C at the timing of level change of the rotation signal. The direction signal is obtained from the output terminal of the flip-flop circuit. Although simple circuitry is used, the direction detection can be surely conducted.

The direction signal producing circuit comprises: the first flip-flop circuit of the edge-trigger type which receives the level of the shaped position signal C at one kind of the timing of level change (the leading edge) of the rotation signal and which outputs the first direction signal; the second flip-flop circuit of the edge-trigger type which receives the level of the shaped position signal C at the other kind of the timing of level change (the falling edge) of the rotation signal and which outputs the second direction signal; and the direction signal output circuit (AND circuit) which produces the direction signal J in correspondence with the first and second direction signals. According to this configuration, the direction signal can be detected each time when the level of the rotation signal is changed, thereby enabling the reverse rotation to be detected rapidly and surely.

In the shaped position signal producing circuit, the waveforms of the three-phase output signals in correspondence with the plural-phase position signals of the position detecting circuit are shaped to produce the three-phase shaped position signals A, B, and C, by the three comparators having no hysteresis. Although such very simply comparators are used, it is possible to detect the rotation signal and the direction signal which are free from noise pulses.

The brushless motor of the embodiment comprises the stop operation block which stops the motor rotation in correspondence with the direction command signal of the command block and the direction signal of the rotation detecting block. The stop operation block comprises the activation changing circuit which allows the electric power in correspondence with the activation command signal to be supplied to the coils by the operation of the drive block when the direction command signal indicates the forward rotation command or the direction signal indicates the forward rotation, and stops the activation of the coils when the direction command signal of the command block indicates the reverse rotation command and the direction signal of the rotation detecting block indicates the reverse rotation. Accordingly, the rotor field part can be decelerated and stopped for a very short time period. In other words, the brushless motor has an excellent responsibility.

The brushless motor comprises: the stop detecting circuit of the stop operation block which outputs the stop operation signal when the time interval of the level change of the rotation signal is larger than the predetermined value; and the ejection process block (the ejection driving block and the ejection part) which unloads the disk in correspondence with the stop operation signal. After the stop of the rotation of the disk is surely detected, the disk can be ejected safely, so that the disk is prevented from being damaged during the unloading process. Consequently, the brushless motor suitable for rotating the disk can be realized.

<<SECOND EMBODIMENT>>

Figure 10:
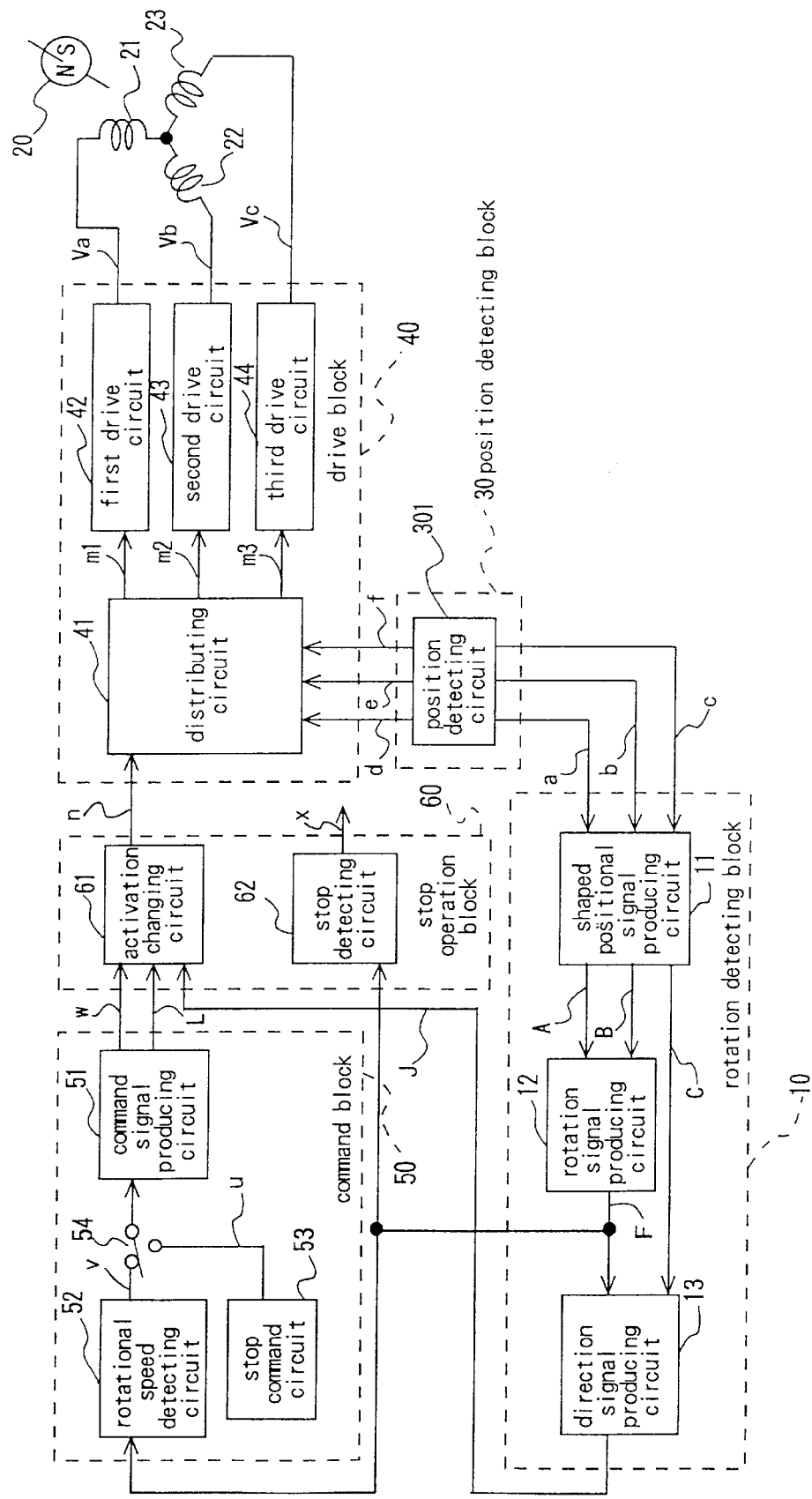
FIG. 10 is a block diagram showing an entire configuration of a brushless motor of a second embodiment of the present invention.
Figure 11:
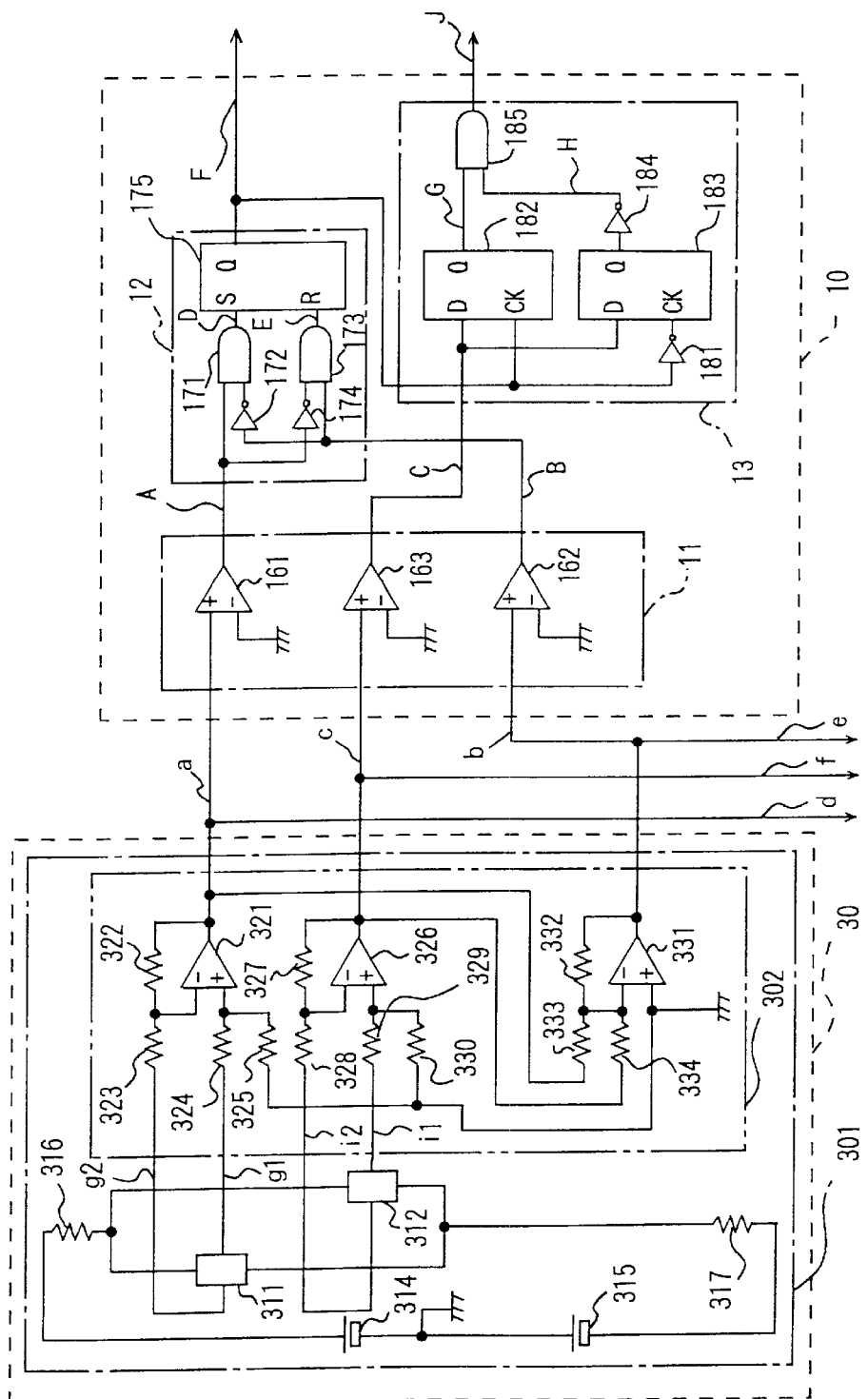
FIG. 11 is a circuit diagram showing configurations of a rotation detecting block 10 and a position detecting block 30 shown in FIG. 10.

FIGS. 10 and 11 show a configuration of a brushless motor of a second embodiment of the present invention.

FIG. 10 shows an entire configuration of the motor. In the embodiment, the number of detected phases of the position signals of the position detecting block 30 is decreased to two, so that the position detecting elements can be reduced to two. The components which are identical with those of the first embodiment are designated by the same reference numerals. That is, the motor structure is identical with that of FIG. 2 (however, the number of the position detecting elements is two), the drive block 40 with that of FIG. 5, the command block 50 with that of FIG. 6, the activation changing circuit 61 of the stop operation block 60 with that of FIG. 7, and the relationships between the motor and the disk with those of FIG. 8. Their duplicated description is omitted.

FIG. 11 shows a configuration of a position detecting circuit 301 of the position detecting block 30 using two-phase position signals. The position detecting circuit 301 comprises a three-phase signal producing circuit 302. Two position detecting elements 311 and 312 of the position detecting circuit 301 correspond to two of the position detecting elements 107a, 107b, and 107c of FIG. 2. DC voltages (+Vcc and −Vcc) of DC power sources 314 and 315 are applied to the elements 311 and 312 via resistors 316 and 317. Differential position signals g1 and g2 corresponding to the magnetic field of the field part 20 (corresponding to the permanent magnet 102 of FIG. 2) are generated at output terminals of the position detecting element 311. The position signals g1 and g2 are differentially amplified by an operational amplifier circuit 321 and resistors 322, 323, 324, and 325 in the three-phase signal producing circuit 302, and an output signal a of a first phase is output. Similarly, differential position signals i1 and i2 corresponding to the magnetic field of the field part 20 are generated at output terminals of the position detecting element 312. The position signals i1 and i2 are differentially amplified by an operational amplifier circuit 326 and resistors 327, 328, 329, and 330 in the three-phase signal producing circuit 302, and an output signal c of a second phase is output. An operational amplifier circuit 331 and resistors 332, 333, and 334 in the three-phase signal producing circuit 302 compose the output signals a and c with each other so as to produce an output signal b of a third phase. Output signals d, e, and f of the position detecting circuit 301 coincide with the output signals a, b, and c, respectively, and are supplied to the drive block 40. According to the rotational movement of the field part 20, the output signals a, b, and c, and the output signals d, e, and f of the position detecting circuit 301 vary analoguely so as to constitute two sets of three-phase signals which have a predetermined electrical phase difference. In other words, the three-phase signal producing circuit 302 produces three-phase signals by using the two-phase position signals g1 and g2, i1 and i2, and supplies the three-phase signals to the rotation detecting block 10 and the drive block 40. In the embodiment, the position signals g1 and g2, and i1 and i2 are in reversed phase relationships, and the signals of reversed phase relationships are not counted in the number of phases.

The shaped position signal producing circuit 11 of the rotation detecting block 10 of FIG. 11 is configured by three comparators 161, 162, and 163, and outputs the shaped position signal A, B, and C obtained by waveform-shaping the output signals a, b, and c, respectively. The rotation signal producing circuit 12 receives the two-phase shaped position signals A and B. In the rotation signal producing circuit 12, the inverting circuit 172 and the AND circuit 171 produce the AND signal D of the negation of the signal B and the signal A, and the AND signal D is supplied to the set terminal of the set-reset type flip-flop circuit 175. The inverting circuit 174 and the AND circuit 173 produce the AND signal E of the negation of the signal A and the signal B, and the AND signal is supplied to the reset terminal of the flip-flop circuit 175. As a result, the digital-type rotation signal F in synchronization with the shaped position signal A (or the shaped position signal B) is obtained at the output terminal of the flip-flop circuit 175. The direction signal producing circuit 13 has the first flip-flop circuit 182 of the edge-trigger type, and the second flip-flop circuit 183 of the edge-trigger type. The first flip-flop circuit 182 latches the level of the shaped position signal C by using the leading edge of the rotation signal F as the clock signal, and outputs the first direction signal G. The second flip-flop circuit 183 latches the level of the shaped position signal C by using the falling edge (the timing when the level of the rotation signal F is changed from "H" to "L") of the rotation signal F as the clock signal, and outputs the second direction signal H via the inverting circuit 184. The AND circuit 185 functioning as the direction signal output circuit produces and outputs the direction signal J in correspondence with the first and second direction signals G and H.

In the embodiment, the three-phase output signals a, b, and c, and the output signals d, e, and f are produced by using the two-phase position signals obtained from the two position detecting elements, whereby the desired operation of the brushless motor is realized. Therefore, the number of the position detecting elements can be reduced and the motor structure can be very simplified.

Generally, a position signal contains harmonic components. Therefore, the output signal b composed by the two-phase position signals with each other has a distorted waveform. In the brushless motor of the embodiment, the shaped position signal A is produced by shaping the position signal appearing in the position detecting element (or the output signal a), and the rotation signal F synchronized with the shaped position signal A is produced. Therefore, the rotation signal F can be suitable to use an accurate and correct rotational speed measurement. The shaped position signal C is produced by shaping the position signal appearing in another position detecting element (or the output signal c), and the level of the shaped position signal C becomes stable at the timing of a level change of the rotation signal F. Therefore, the direction signal J can be measured stably.

<<THIRD EMBODIMENT>>

Figure 12:
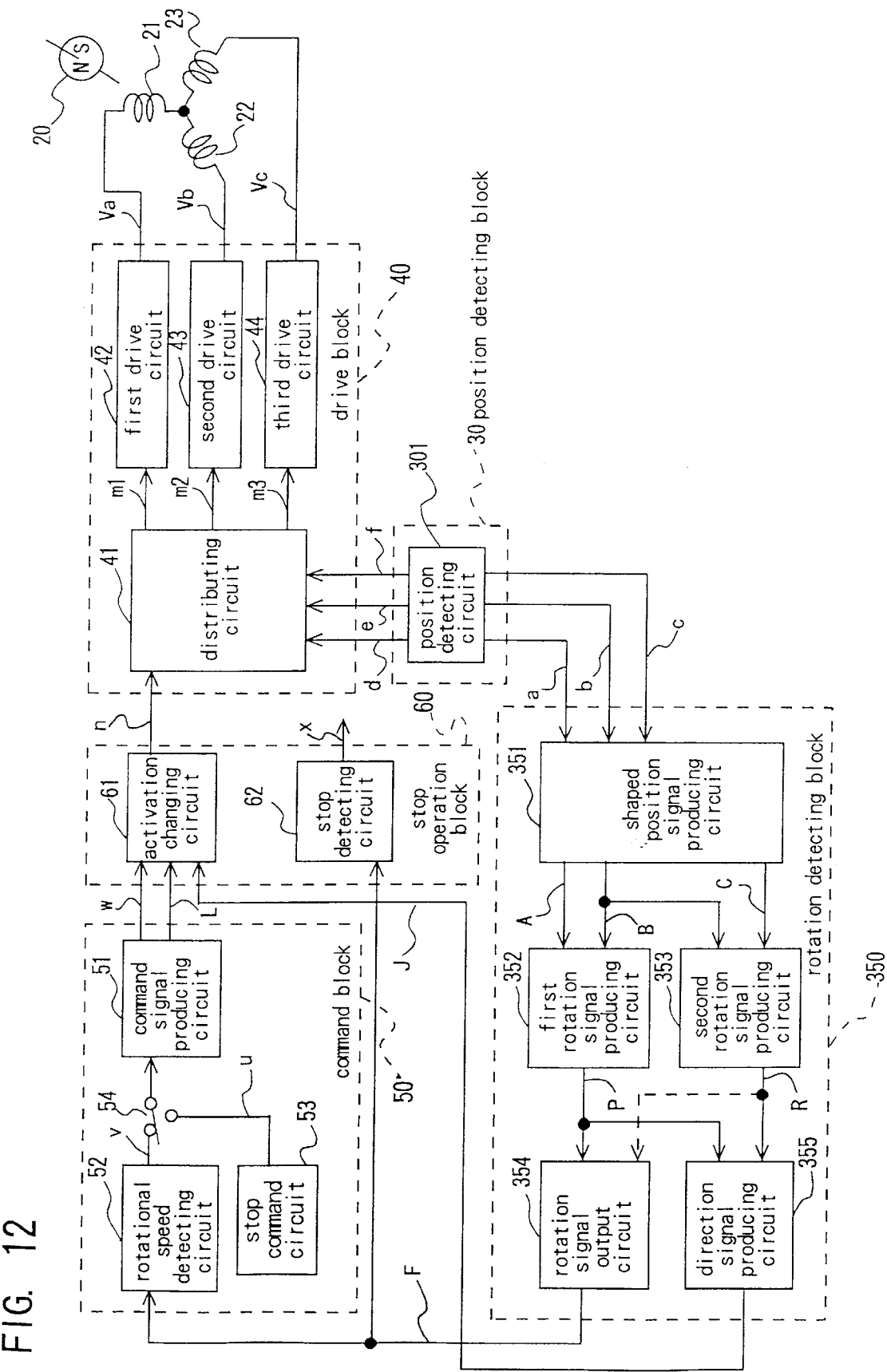
FIG. 12 is a block diagram showing an entire configuration of a brushless motor of a third embodiment of the present invention.
Figure 13:
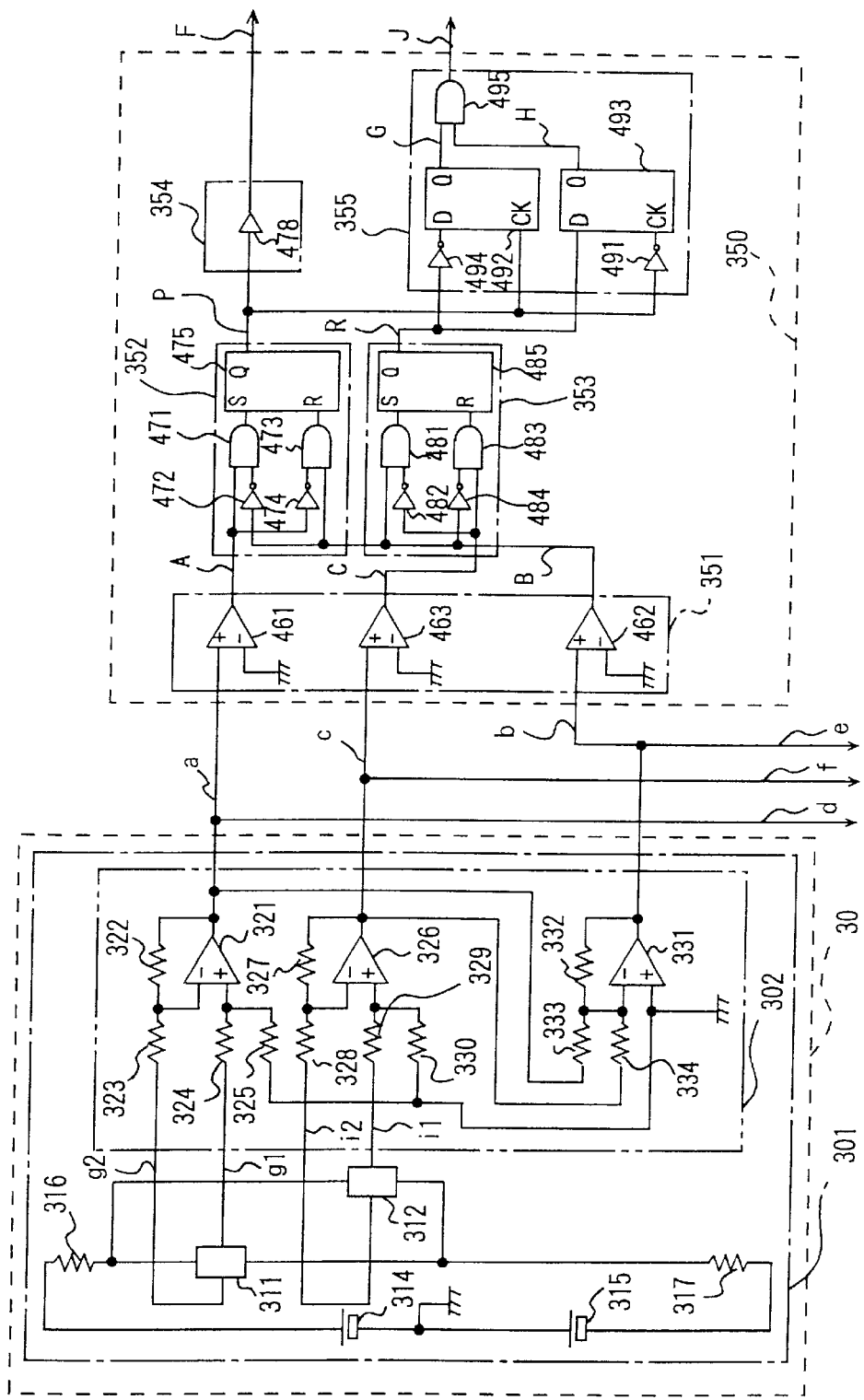
FIG. 13 is a circuit diagram showing configurations of a rotation detecting block 350 and a position detecting block 30 shown in FIG. 12.

FIGS. 12 and 13 show a brushless motor of a third embodiment of the present invention. FIG. 12 shows an entire configuration of the motor. In the embodiment, the rotation detecting block comprises a first rotation signal producing circuit 352 and a second rotation signal producing circuit 353, so that the rotation signal F and the direction signal J can be obtained accurately. The components identical with those of the above-mentioned embodiments are designated by the same reference numerals. That is, the motor structure is identical with that of FIG. 2, the drive block 40 with that of FIG. 5, the command block 50 with that of FIG. 6, the activation changing circuit 61 of the stop operation block 60 with that of FIG. 7, the relationships between the motor and the disk with those of FIG. 8, and the position detecting circuit 301 of the position detecting block 30 with that of FIG. 11. Their duplicated description is omitted.

The rotation detecting block 350 comprises a shaped position signal producing circuit 351, a first rotation signal producing circuit 352, a second rotation signal producing circuit 353, a rotation signal output circuit 354, and a direction signal producing circuit 355.

FIG. 13 specifically shows configurations of the position detecting circuit 301 of the position detecting block 30, and the shaped position signal producing circuit 351, the first rotation signal producing circuit 352, the second rotation signal producing circuit 353, the rotation signal output circuit 354, and the direction signal producing circuit 355 in the rotation detecting block 350. The position detecting circuit 301 of the position detecting block 30 is identical with that shown in FIG. 11, and the motor structure is identical with that of FIG. 2 (however, the number of the position detecting elements is reduced to two). Their detailed description is omitted.

The operations of the portions of the rotation detecting block 350 of FIG. 13 will be described in detail with reference to the waveforms of the signals shown in FIGS. 14A through 14L. The abscissae of FIGS. 14A through 14L indicate the time. In FIGS. 14A through 14L, the forward rotation state is carried out in the left side of the one-dot chain line, and the state is changed to the reverse rotation state at the one-dot chain line. The shaped position signal producing circuit 351 of the rotation detecting block 350 of FIG. 13 is configured by three comparators 461, 462, and 463. The comparators 461, 462, and 463 receive the output signals a, b, and c of the position detecting circuit 301, respectively [see FIGS. 14A to 14C], and output the shaped position signal A, B, and C by waveform-shaping the output signals, respectively [see FIGS. 14D to 14F]. The comparators 461, 462, and 463 are configured in the same manner as those shown in FIG. 4.

The first rotation signal producing circuit 352 receives a pair of the shaped position signals A and B. In the first rotation signal producing circuit 352, an inverting circuit 472 and an AND circuit 471 produce the AND signal of the negation of the signal B and the signal A, and the AND signal is supplied to the set terminal of a set-reset type flip-flop circuit 475. An inverting circuit 474 and an AND circuit 473 produce the AND signal of the negation of the signal A and the signal B, and the AND signal is supplied to the reset terminal of the flip-flop circuit 475. As a result, a digital-type first rotation signal P is obtained at the output terminal of the flip-flop circuit 475. The level of the first rotation signal P is changed in synchronization with the shaped position signal A during the forward rotation, and changed in synchronization with the shaped position signal B during the reverse rotation. In the first rotation signal P, the noises at the timing of level change are eliminated [see FIG. 14G].

The second rotation signal producing circuit 353 receives another pair of the shaped position signals B and C. In the second rotation signal producing circuit 353, an inverting circuit 482 and an AND circuit 481 produce an AND signal of the negation of the signal C and the signal B, and the AND signal is supplied to the set terminal of a set-reset type flip-flop circuit 485. An inverting circuit 484 and an AND circuit 483 produce an AND signal of the negation of the signal B and the signal C, and the AND signal is supplied to the reset terminal of the flip-flop circuit 485. As a result, a digital-type second rotation signal R is obtained at the output terminal of the flip-flop circuit 485. The level of the second rotation signal R is changed in synchronization with the shaped position signal B during the forward rotation, and changed in synchronization with the shaped position signal C during the reverse rotation. In the second rotation signal R, the noises at the timing of level change are eliminated [see FIG. 14H].

The rotation signal output circuit 354 is configured by a buffer circuit 478, and outputs the first rotation signal P as the rotation signal F of the rotation detecting block 350. During the forward rotation, therefore, the level of the rotation signal F is changed in synchronization with the shaped position signal A.

Figure 14:
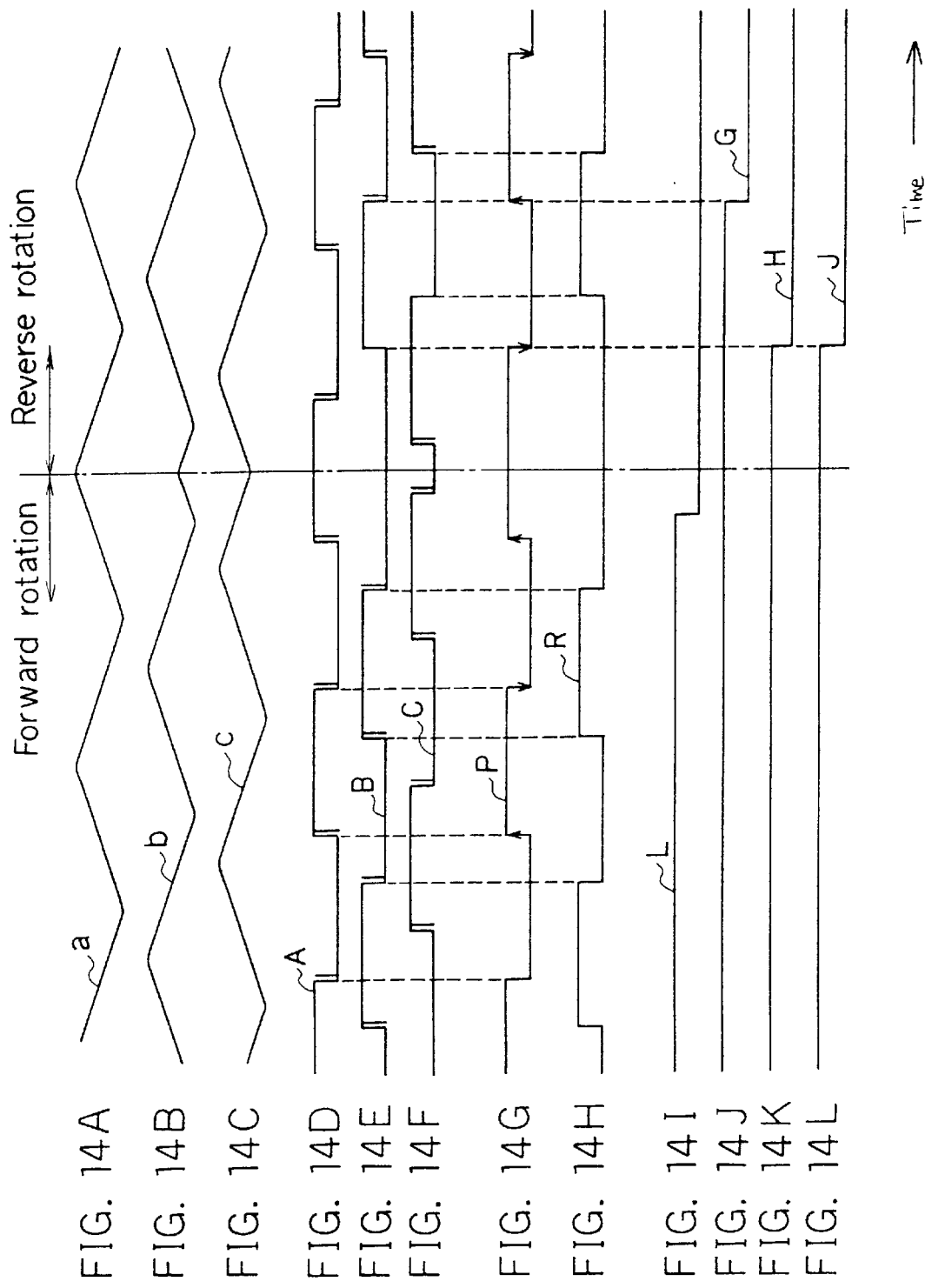
FIG. 14A is a waveform chart showing a waveform of an output signal a output from a position detecting circuit shown in FIG. 12.
FIG. 14B is a waveform chart showing a waveform of an output signal b output from the position detecting circuit shown in FIG. 12.
FIG. 14C is a waveform chart showing a waveform of an output signal c output from the position detecting circuit shown in FIG. 12.
FIG. 14D is a waveform chart showing a waveform of a shaped position signal A output from a shaped position signal producing circuit shown in FIG. 12.
FIG. 14E is a waveform chart showing a waveform of a shaped position signal B output from the shaped position signal producing circuit shown in FIG. 12.
FIG. 14F is a waveform chart showing a waveform of a shaped position signal C output from the shaped position signal producing circuit shown in FIG. 12.
FIG. 14G is a waveform chart showing a waveform of a first rotation signal P output from a first rotation signal producing circuit shown in FIG. 12.
FIG. 14H is a waveform chart showing a waveform of a second rotation signal R output from a second rotation signal producing circuit shown in FIG. 12.
FIG. 14I is a waveform chart showing a waveform of a direction command signal L output from a command signal producing circuit shown in FIG. 12.
FIG. 14J is a waveform chart showing a waveform of a first direction signal G output from a first flip-flop circuit shown in FIG. 13.
FIG. 14K is a waveform chart showing a waveform of a second direction signal H output from a second flip-flop circuit shown in FIG. 13.
FIG. 14L is a waveform chart showing a waveform of a direction signal J output from a direction signal producing circuit shown in FIG. 12.

The direction signal producing circuit 355 has a first flip-flop circuit 492 of the edge-trigger type, and a second flip-flop circuit 493 of the edge-trigger type. The first flip-flop circuit 492 latches the level of the second rotation signal R (more correctly, the negation of the signal R) by using the leading edge of the first rotation signal P as the clock signal, and outputs a first direction signal G. The second flip-flop circuit 493 latches the level of the second rotation signal R by using the falling edge of the first rotation signal P as the clock signal, and outputs a second direction signal H. An AND circuit 485 functioning as the direction signal output circuit produces a direction signal J in correspondence with the first and second direction signals G and H [see FIGS. 14J to 14L]. FIG. 14I shows a waveform of a direction command signal L. When the direction command signal L is changed from the forward rotation command ("H" level) to the reverse rotation command ("L" level), the reverse direction torque is generated by the motor operation, thereby decelerating the motor and then causing the field part 20 to be rotated reversely (actually, the time period of the reverse rotation is short).

In FIG. 12, the field part 20, the three-phase coils 21, 22, and 23, the drive block 40, the command block 50, and the stop operation block 60 are the same as those of the above-mentioned first embodiment (FIG. 1), and their detailed description is omitted.

Also in the brushless motor of the embodiment, as the rotation signal F and the direction signal J are produced by using the position signals of the position detecting elements, it is entirely unnecessary to add further parts to the structure of the motor. Accordingly, a simple motor configuration can be realized. In the brushless motor of the embodiment, the three-phase output signals a, b, and c, and the output signals d, e, and f are produced by using the two-phase position signals obtained from the two position detecting elements. Therefore, the motor structure can be very simplified.

In the rotation detecting block, the noises at the timing of level change of the first rotation signal P are eliminated by using a pair of the shaped position signals A and B, and the noises at the timing of level change of the second rotation signal R are eliminated by the using another pair of the shaped position signals B and C. Furthermore, one of the first and second rotation signals P and R is used as the rotation signal F. Therefore, an erroneous operation does not occur in the rotational speed measurement using the rotation signal F. The direction signal J is obtained correctly in correspondence with the level of the second rotation signal R at the timing of a level change of the first rotation signal P, since the first and second rotation signals P and R are free from the noises and the level of the second rotation signal R becomes stable at the timing of a level change of the first rotation signal P. Therefore, even when the shaped position signals A, B, and C contain the noises at each edge, it is possible to obtain the rotation signal F and the direction signal J from which the noises are completely eliminated.

In the same manner as the above-mentioned first embodiment, the brushless motor of the embodiment comprises the stop operation block which stops the motor rotation in correspondence with the direction command signal of the command block and the direction signal of the rotation detecting block. The stop operation block comprises the activation changing circuit. When the direction command signal indicates the forward rotation command or the direction signal indicates the forward rotation, the activation changing circuit allows the electric power in correspondence with the activation command signal to be supplied to the coils. When the direction command signal of the command block indicates the reverse rotation command and the direction signal of the rotation detecting block indicates the reverse rotation, the activation changing circuit stops the activation of the coils. When the stop command is issued, therefore, the rotor of the motor and the field part can be decelerated and stopped for a short time period. In other words, the brushless motor has an excellent responsibility.

The brushless motor comprises the stop detecting circuit of the stop operation block which outputs the stop operation signal when the time interval of the level change of the rotation signal F is larger than the predetermined value, and the process block (the ejection driving block and the ejection part) which unloads the disk in correspondence with the stop operation signal. Therefore, the stop of the rotation of the disk can be surely detected, so that the disk is prevented from being damaged during the unloading process. Consequently, a brushless motor suitable for rotating a disk can be realized.

<<FOURTH EMBODIMENT>>

Figure 15:
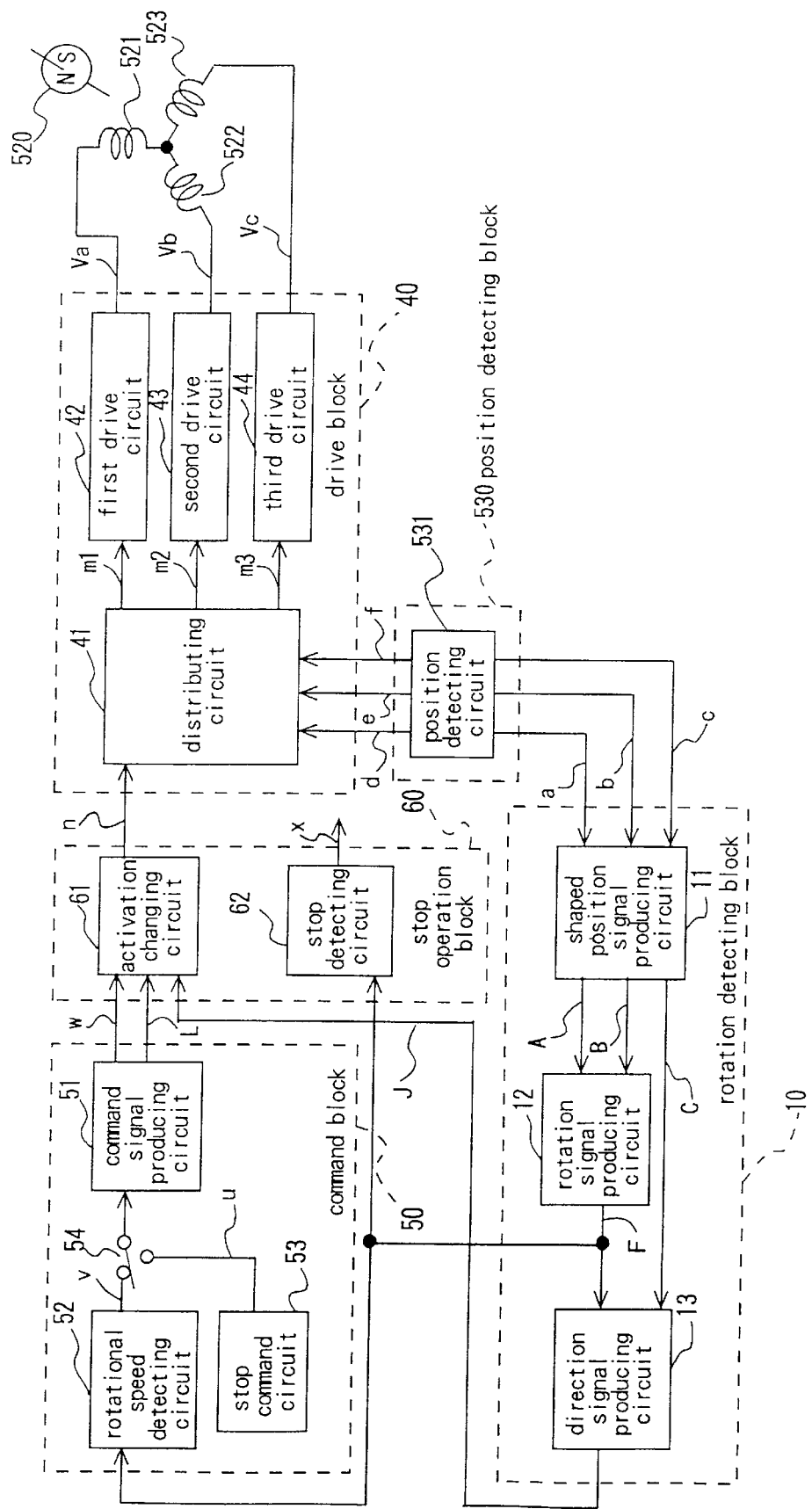
FIG. 15 is a block diagram showing an entire configuration of a brushless motor of a fourth embodiment of the present invention.
Figure 16:
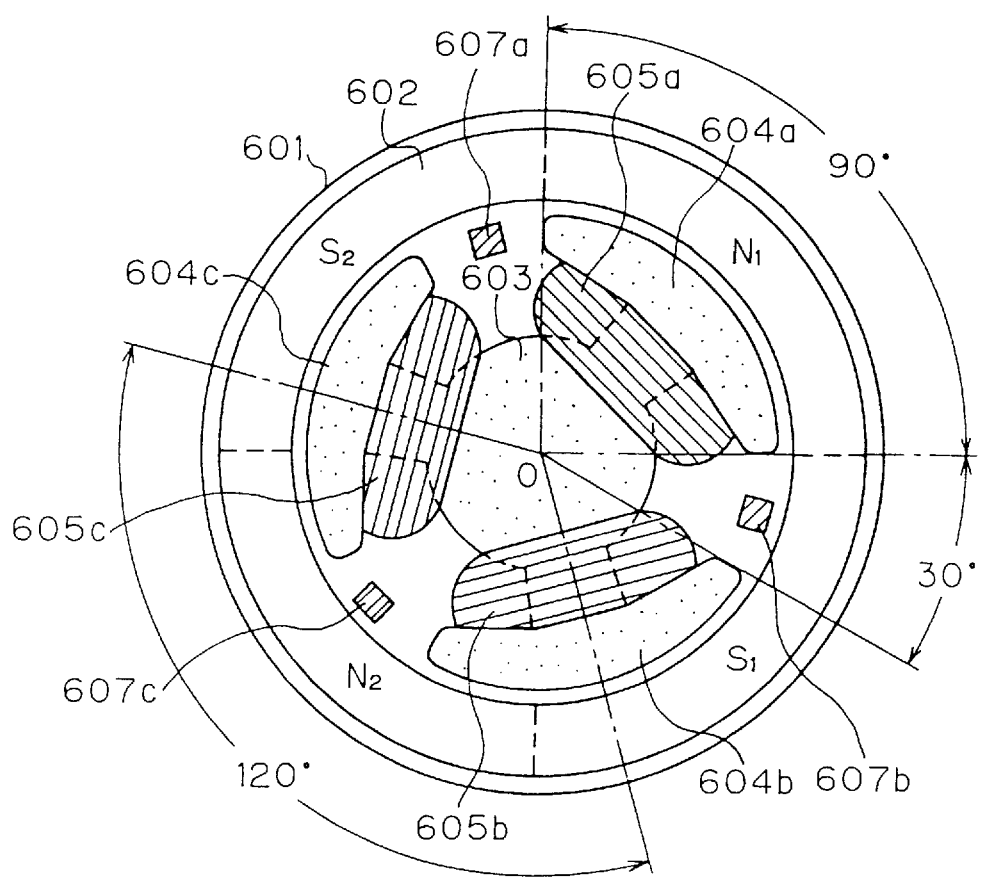
FIG. 16 is a cross-sectional view showing a configuration of the brushless motor of the fourth embodiment.
Figure 17:
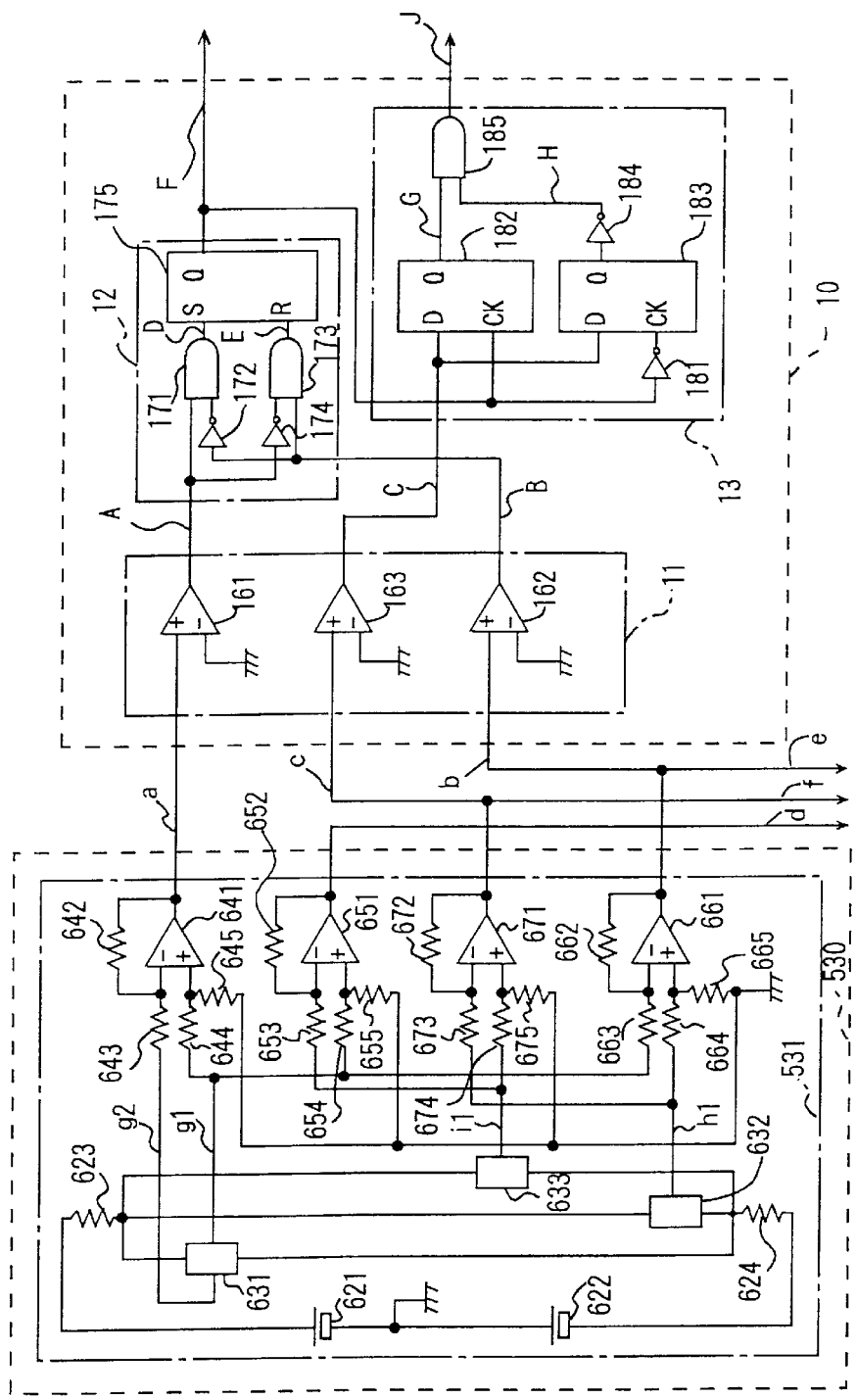
FIG. 17 is a circuit diagram showing configurations of a rotation detecting block 10 and a position detecting block 530 shown in FIG. 15.

FIGS. 15 through 17 show a brushless motor of a fourth embodiment of the present invention. FIG. 15 shows an entire configuration of the motor. In the embodiment, the motor structure of the first embodiment is modified so that the positional relationships between the coils and the attached positions of position detecting elements are shifted from each other by the electrical angle of about 30 degrees. This configuration allows the position detecting elements to be disposed between the salient poles of the armature core, whereby the motor structure can be miniaturized. The components which are identical with those of the above-mentioned embodiments are designated by the same reference numerals. That is, the drive block 40 is identical with that of FIG. 5, the command block 50 with that of FIG. 6, the stop operation block 60 with that of FIG. 7, and the relationships between the motor and the disk with those of FIG. 8. Their duplicated description is omitted.

A field part 520 shown in FIG. 15 is mounted on the rotor and forms plural magnetic field poles by means of a magnetic flux generated by a permanent magnet, thereby generating a magnetic field flux. Three-phase coils 521, 522, and 523 are mounted on the stator and arranged so as to be electrically separated from each other by a predetermined angle (corresponding to 120 degrees in the electrical angle) with respect to the interlinkage with the magnetic flux generated by the field part 520. A required electric power is distributively supplied to the three-phase coils 521, 522, and 523 in accordance with the relative position between the field part 520 and the coils, thereby rotating the field part 520 and the disk attached to the rotor.

FIG. 16 specifically shows configurations of the field part 520 and the three-phase coils 521, 522, and 523. In an annular permanent magnet 602 attached to the inner side of the rotor 601, the inner and end faces are magnetized so as to form four poles, thereby constituting the field part 520 shown in FIG. 15. An armature core 603 is placed at a position of the stator which opposes the poles of the permanent magnet 602. Three salient poles 604a, 604b, and 604c are disposed in the armature core 603 at intervals of 120 degrees in the mechanical angle. Three-phase coils 605a, 605b, and 605c (corresponding to the three-phase coils 521, 522, and 523 shown in FIG. 15) are wound on the salient poles 604a, 604b, and 604c by using winding slots 606a, 606b, and 606c, respectively. Among the coils 605a, 605b, and 605c, phase differences of 120 degrees in the electrical angle are established with respect to the interlinkage with magnetic flux from the permanent magnet 602. Three position detecting elements 607a, 607b, and 607c (for example, Hall elements which are magnetoelectrical converting elements) are arranged on the stator. The pole of the end face of the permanent magnet 602 is detected, thereby obtaining three-phase position signals corresponding to the relative position between the field part and the coils. In the embodiment, the coils and the position detecting elements are shifted in phase by the electrical angle of 120 degrees (60 degrees in the mechanical angle). The position detecting elements are disposed in winding slots between the salient poles. As a result, the position detecting elements can be disposed in the motor, whereby the motor structure can be miniaturized. Since the position detecting elements are disposed with being shifted, driving signals shifted by 30 degrees with respect to the position signals of the position detecting elements are applied to the coils, thereby obtaining a rotation force in a predetermined direction.

FIG. 17 shows a configuration of the position detecting circuit 531 of the position detecting block 530. Position detecting elements 631, 632, and 633 of the position detecting circuit 531 correspond to the position detecting elements 607a, 607b, and 607c shown in FIG. 16. DC voltages (+Vcc and −Vcc) of DC power sources 621 and 622 are applied to the elements 631, 632 and 633 via resistors 623 and 624. Differential position signals g1 and g2 corresponding to the magnetic field of the field part 520 (corresponding to the permanent magnet 602 of FIG. 16) are detected at output terminals of the position detecting element 631. The position signals g1 and g2 are differentially amplified by an operational amplifier circuit 641 and resistors 642, 643, 644, and 645, and an output signal a which varies in the same phase of the position signal g1 is obtained. Similarly, position signals h1 and i1 are output from output terminals of the position detecting elements 632 and 633, respectively. The position signals g1, h1, and i1 are three-phase signals which have a phase difference of 120 degrees in the electrical angle. The position signals g1 and i1 are differentially amplified by an operational amplifier circuit 651 and resistors 652, 653, 654, and 655, and an output signal d proportional to a signal (g1−i1) is obtained. As a result, the output signal d is a signal shifted in phase by 30 degrees in the electrical angle from the position signal g1. Similarly, an output signal e proportional to a signal (h1−g1 ) is obtained by an operational amplifier circuit 661 and resistors 662, 663, 664, and 665. The output signal e is a signal shifted by 30 degrees from the position signal h1. Similarly, an output signal f proportional to a signal (i1−h1) is obtained by an operational amplifier circuit 671 and resistors 672, 673, 674, and 675. The output signal f is a signal shifted by 30 degrees from the position signal i1. The output signals b and c of the position detecting circuit 531 coincide with the output signals e and f, respectively. The output signals d, e, and f are three-phase signals which have a phase difference of 120 degrees in the electrical angle and which are shifted in phase by 30 degrees from the three-phase position signals g1, h1, and i1, respectively. The three-phase output signals d, e, and f are supplied to the drive block 40, and a required electric power is distributed to the coils 521, 522, and 523 according to the three-phase signals d, e, and f so as to produce a torque of the motor. On the other hand, the three-phase output signals a, b, and c of the position detecting circuit 531 which are electrically different from each other in phase are supplied to the rotation detecting block 10.

The operations of the rotation detecting block 10 shown in FIG. 17 will be described with reference to waveforms of the signals shown in FIGS. 18A through 18M. The abscissae of FIGS. 18A through 18M indicate the time. In FIGS. 18A through 18M, the forward rotation state is carried out in the left side of the one-dot chain line, and the state is changed to the reverse rotation state at the one-dot chain line. The three-phase output signals a, b, and c of the position detecting circuit 531 are three-phase signals, although they have phase differences not equal to each other in the electrical angle. Specifically, the phase difference between the output signals a and b is about 150 degrees, that between the output signals b and c is about 120 degrees, and that between the output signals c and a is about 90 degrees [see FIGS. 18A to 18C]. The three comparators 161, 162, and 163 of the shaped position signal producing circuit 11 output shaped position signal A, B, and C by waveform-shaping the output signals a, b, and c of the position detecting circuit 531, respectively [see FIGS. 18D to 18F]. The rotation signal producing circuit 12 receives a pair of the shaped position signals A and B. In the rotation signal producing circuit 12, the inverting circuit 172 and the AND circuit 171 produce the AND signal D of the negation of the signal B and the signal A, and the AND signal D is supplied to the set terminal of the set-reset type flip-flop circuit 175 [see FIG. 18G]. The inverting circuit 174 and the AND circuit 173 produce the AND signal E of the negation of the signal A and the signal B, and the AND signal is supplied to the reset terminal of the flip-flop circuit 175 [see FIG. 18H]. As a result, the digital-type rotation signal F in synchronization with the shaped position signal A (or the shaped position signal B) is obtained at the output terminal of the flip-flop circuit 175 [see FIG. 18I].

Figure 18:
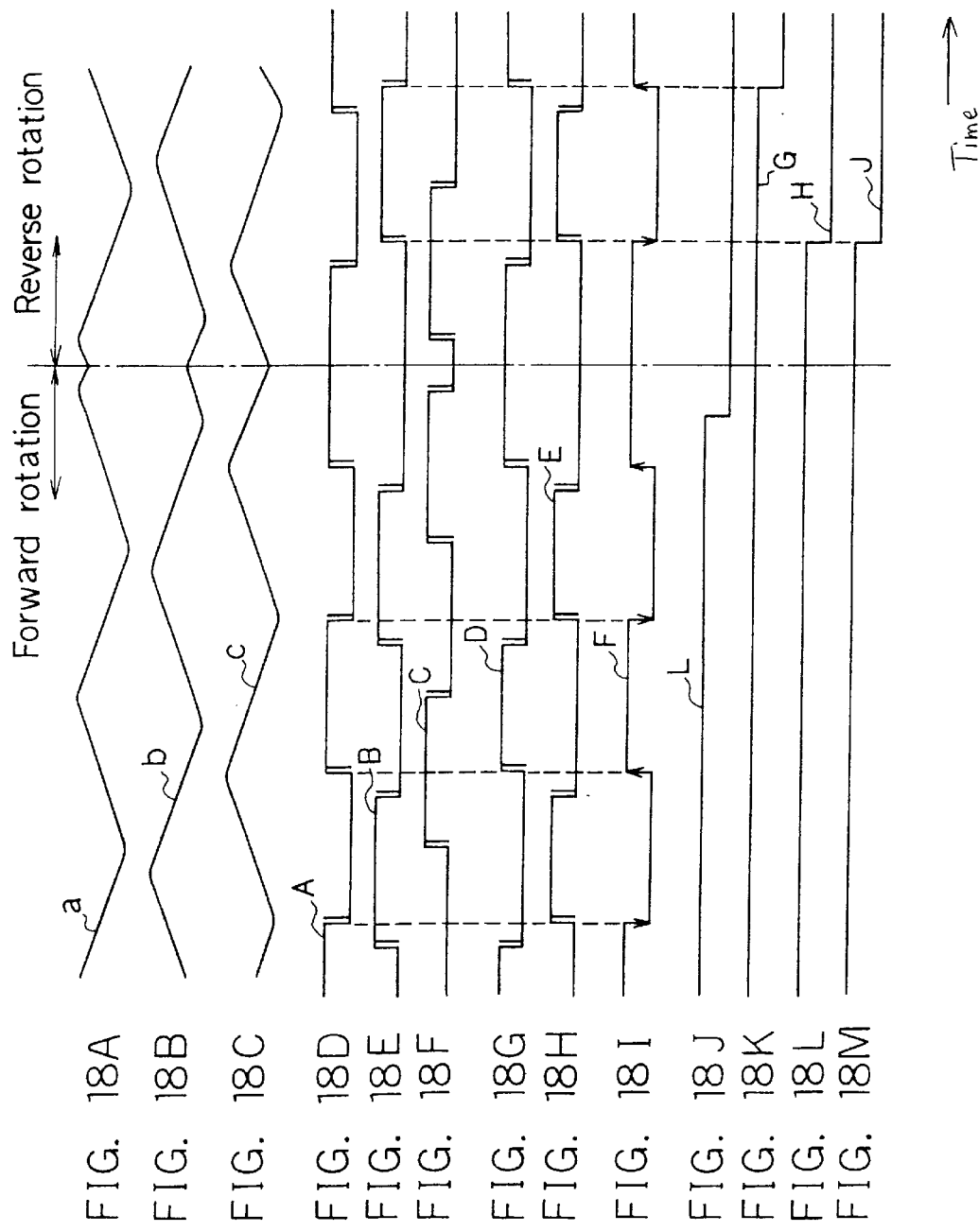
FIG. 18A is a waveform chart showing a waveform of an output signal a output from a position detecting circuit shown in FIG. 15.
FIG. 18B is a waveform chart showing a waveform of an output signal b output from the position detecting circuit shown in FIG. 15.
FIG. 18C is a waveform chart showing a waveform of an output signal c output from the position detecting circuit shown in FIG. 15.
FIG. 18D is a waveform chart showing a waveform of a shaped position signal A output from a shaped position signal producing circuit shown in FIG. 15.
FIG. 18E is a waveform chart showing a waveform of a shaped position signal B output from a shaped position signal producing circuit shown in FIG. 15.
FIG. 18F is a waveform chart showing a waveform of a shaped position signal C output from the shaped position signal producing circuit shown in FIG. 15.
FIG. 18G is a waveform chart showing a waveform of an AND signal D output from an AND circuit shown in FIG. 17.
FIG. 18H is a waveform chart showing a waveform of an AND signal E output from an AND circuit shown in FIG. 17.
FIG. 18I is a waveform chart showing a waveform of a rotation signal F output from a rotation signal producing circuit shown in FIG. 15.
FIG. 18J is a waveform chart showing a waveform of a direction command signal L output from a command signal producing circuit shown in FIG. 15.
FIG. 18K is a waveform chart showing a waveform of a first direction signal G output from a first flip-flop circuit shown in FIG. 17.
FIG. 18L is a waveform chart showing a waveform of a second direction signal H output from a second flip-flop circuit shown in FIG. 17.
FIG. 18M is a waveform chart showing a waveform of a direction signal J output from a direction signal producing circuit shown in FIG. 15.

The direction signal producing circuit 13 has the first flip-flop circuit 182 of the edge-trigger type, and the second flip-flop circuit 183 of the edge-trigger type. The first flip-flop circuit 182 latches the level of the shaped position signal C by using the leading edge of the rotation signal F as the clock signal, and outputs the first direction signal G. The second flip-flop circuit 183 latches the level of the shaped position signal C by using the falling edge of the rotation signal F as the clock signal, and outputs the second direction signal H via the inverting circuit 184. The AND circuit 185 functioning as the direction signal output circuit produces and outputs the direction signal J in correspondence with the first and second direction signals G and H [see FIGS. 18K to 18M]. FIG. 18J shows a waveform of the direction command signal L. When the direction command signal L is changed from the forward rotation command ("H" level) to the reverse rotation command ("L" level), the reverse direction torque is generated, thereby decelerating the motor and then causing the field part to be reversely rotated (actually, the time period of the reverse rotation is short).

The drive block 40, the command block 50, and the stop operation block 60 in FIG. 15, and the relationships between the motor and the disk are identical with those of the above-mentioned first embodiment. Their detailed description is omitted. That is, the drive block 40 is identical with that of FIG. 5, the command block 50 with that of FIG. 6, the stop operation block 60 with that of FIG. 7, and the relationships between the motor and the disk with those of FIG. 8.

In the brushless motor of the embodiment, the distributive driving is conducted on the basis of the output signals obtained by shifting the phases of the position signals. Therefore, the position detecting elements can be freely arranged. For example, the position detecting elements can be disposed between the salient poles of the armature core, with the result that the motor structure can be miniaturized.

As shown in the embodiment, the phase differences among the three-phase output signals a, b, and c supplied to the rotation detecting block are not restricted to 120 degrees. The minimum phase difference may be about 30 degrees.

<<FIFTH EMBODIMENT>>

Figure 19:
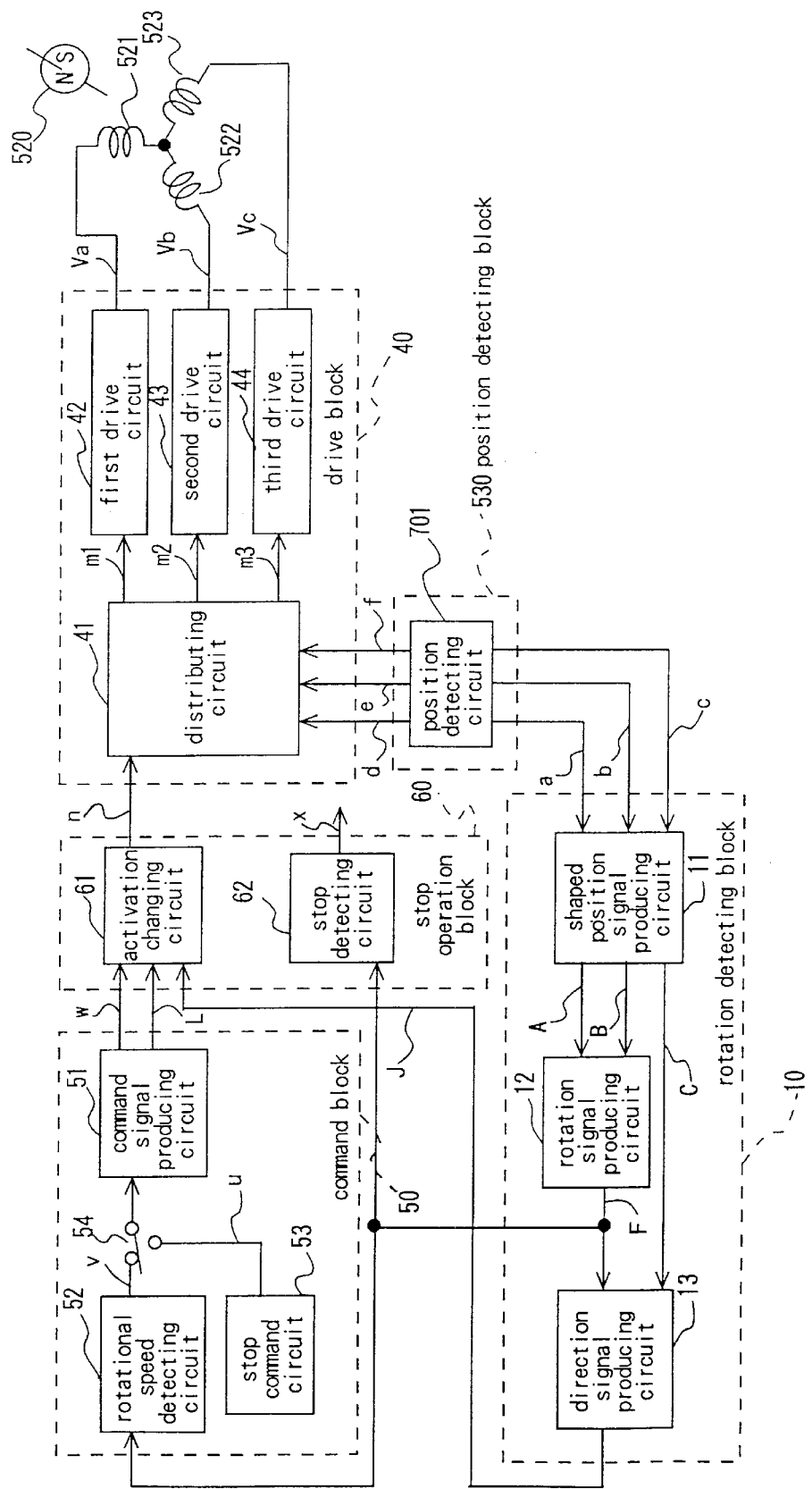
FIG. 19 is a block diagram showing an entire configuration of a brushless motor of a fifth embodiment of the present invention.
Figure 20:
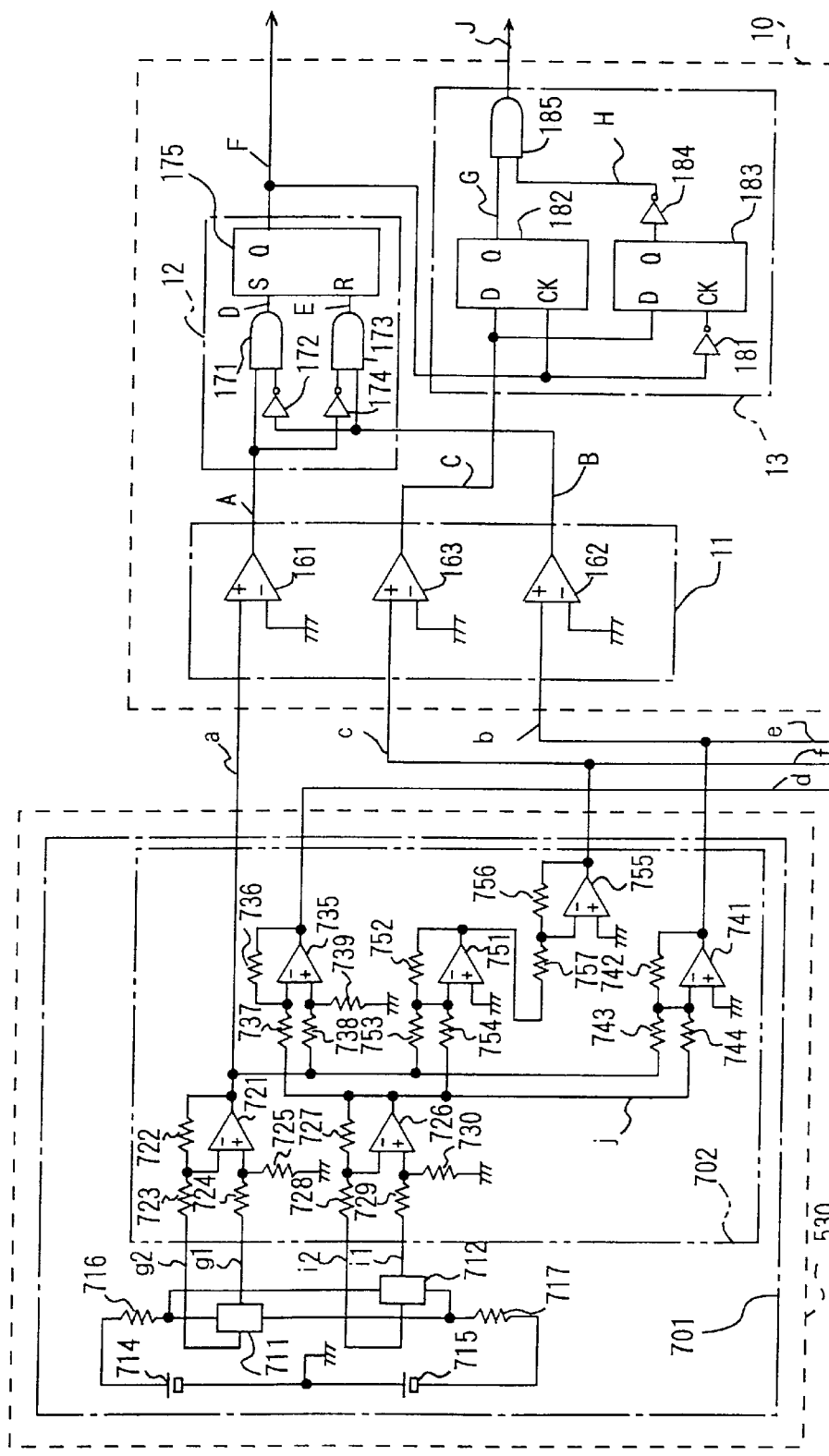
FIG. 20 is a circuit diagram showing configurations of a rotation detecting block 10 and a position detecting block 530 shown in FIG. 19.

FIGS. 19 and 20 show a brushless motor of a fifth embodiment of the present invention. FIG. 19 shows an entire configuration of the motor. In the embodiment, the number of detected phases of the position detecting block of the above-mentioned fourth embodiment is decreased to two, so that the position detecting elements can be reduced to two. The components which are identical with those of the fourth embodiment are designated by the same reference numerals. That is, the motor structure is identical with that of FIG. 16 (however, the number of the position detecting elements is two), the drive block 40 with that of FIG. 5, the command block 50 with that of FIG. 6, the stop operation block 60 with that of FIG. 7, and the relationships between the motor and the disk with those of FIG. 8. Their duplicated description is omitted.

FIG. 20 shows a configuration of a position detecting circuit 701 of the position detecting block 530 using two position detecting elements. The position detecting circuit 701 comprises a three-phase signal producing circuit 702. The position detecting elements 711 and 712 of the position detecting circuit 701 correspond to two of the position detecting elements 607a, 607b, and 607c of FIG. 16. DC voltages (+Vcc and −Vcc) of DC power sources 714 and 715 are applied to the elements 711 and 712 via resistors 716 and 717. Differential position signals g1 and g2 corresponding to the magnetic field of the field part 520 (corresponding to the permanent magnet 602 of FIG. 16) are detected at output terminals of the position detecting element 711. The position signals g1 and g2 are differentially amplified by an operational amplifier circuit 721 and resistors 722, 723, 724, and 725 of the three-phase signal producing circuit 702, and an output signal a of a first phase which analoguely varies in the same phase with the position signal g1 is obtained. Similarly, differential position signals i1 and i2 are detected at output terminals of the position detecting element 712. The position signals i1 and i2 are differentially amplified by an operational amplifier circuit 726 and resistors 727, 728, 729, and 730 of the three-phase signal producing circuit 702, and an analogue signal j which varies in the same phase with the position signal i1 is obtained. The signals a and j are two-phase signals which have a phase difference of 120 degrees in the electrical angle. An output signal d of a first phase proportional to a signal (a−j) is output by an operational amplifier circuit 735 and resistors 736, 737, 738, and 739. The output signal d is a signal shifted in phase by 30 degrees in the electrical angle from the position signal g1. An operational amplifier circuit 741 and resistors 742, 743, and 744 compose the signals a and j at a ratio of 2:1 so as to produce an output signal e of a second phase. An operational amplifier circuit 751 and resistors 752, 753, and 754 compose the signals a and j at a ratio of 1:2, and an operational amplifier circuit 755 and resistors 756, 756, and 758 amplifies inversely the composed signal so as to produce an output signal f of a third phase. The output signals b and c of the position detecting circuit 701 coincide with the output signals e and f, respectively. The output signals d, e, and f of the three-phase signal producing circuit 702 are three-phase signals produced from the two-phase position signals g1 and i1. The output signals d and f are shifted in phase from the position signals g1 and i1 by 30 degrees in the electrical angle, respectively. The three-phase output signals d, e, and f are supplied to the drive block 40, and a required electric power is distributed to the coils 521, 522, and 523 in accordance with the output signals d, e, and f, thereby generating a motor torque.

The three-phase output signals a, b, and c of the position detecting circuit 701 which have different phases are supplied to the rotation detecting block 10. The phase difference between the output signals a and b is about 150 degrees, that between the output signals b and c is about 120 degrees, and that between the output signals c and a is about 90 degrees. The configuration and operation of the rotation detecting block 10 of FIG. 20 are identical with those of the above-mentioned fourth embodiment and shown in FIG. 17, and hence their detailed description is omitted.

The drive block 40, the command block 50, and the stop operation block 60 in FIG. 19, and the relationships between the motor and the disk are identical with those of the above-mentioned fourth embodiment. Their detailed description is omitted. That is, the drive block 40 is identical with that of FIG. 5, the command block 50 with that of FIG. 6, the stop operation block 60 with that of FIG. 7, and the relationships between the motor and the disk with those of FIG. 8.

In the brushless motor of the embodiment, the three-phase output signals a, b, and c, and the three-phase output signals d, e, and f are produced by using two-phase position signals obtained from the two position detecting elements, whereby the desired operation of the brushless motor is realized. Therefore, the number of the position detecting elements can be reduced and the motor structure can be very simplified.

Generally, as a position signal contains harmonic components, the composed signal b has a distorted waveform. To comply with this, in the brushless motor of the embodiment, the shaped position signal A is produced by shaping the position signal appearing in the position detecting element, and the rotation signal F synchronized with the shaped position signal A is produced. Therefore, the rotation signal F can be used for accurate and correct rotational speed measurement.

<<SIXTH EMBODIMENT>>

Figure 21:
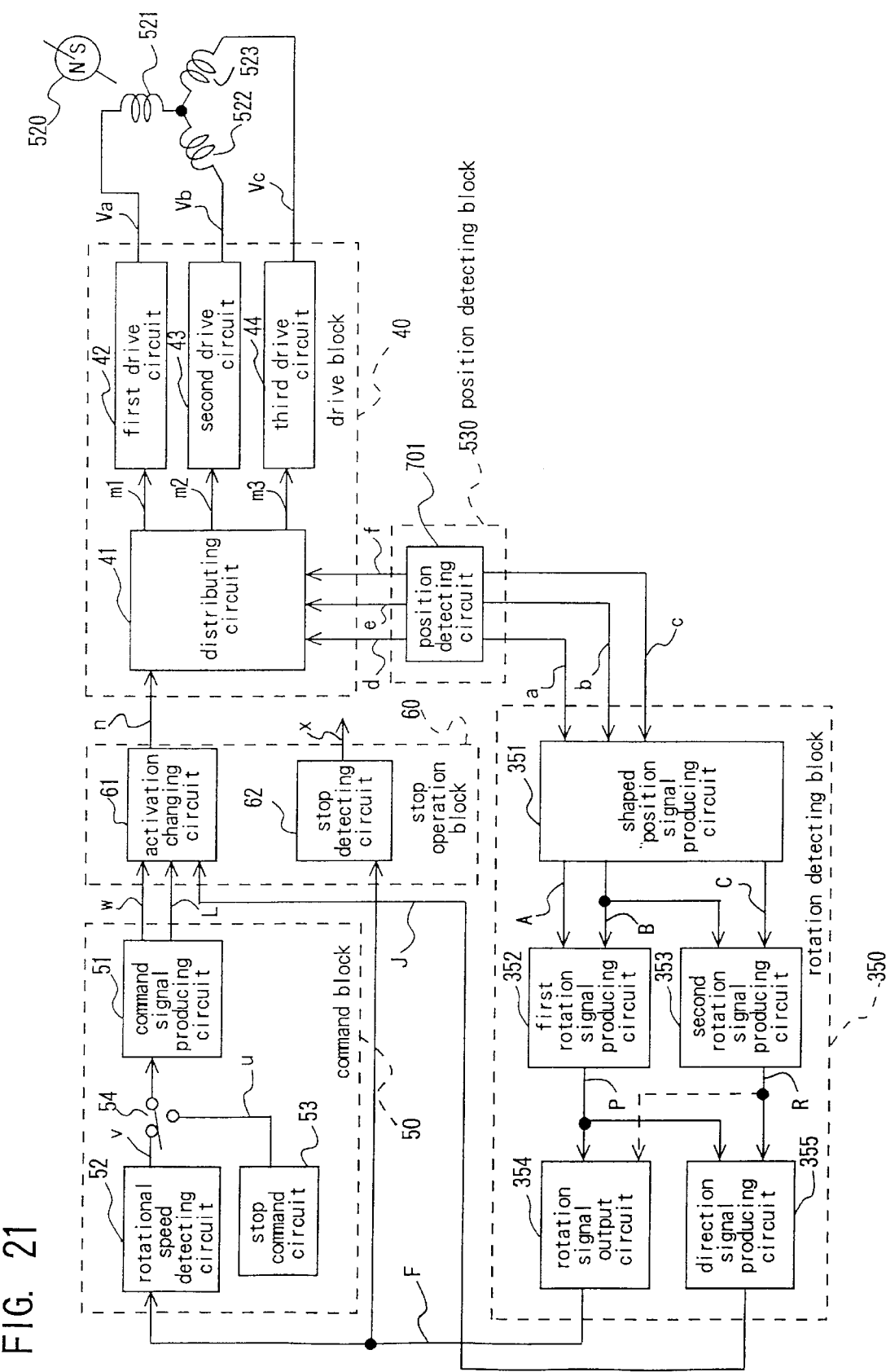
FIG. 21 is a block diagram showing an entire configuration of a brushless motor of a sixth embodiment of the present invention.
Figure 22:
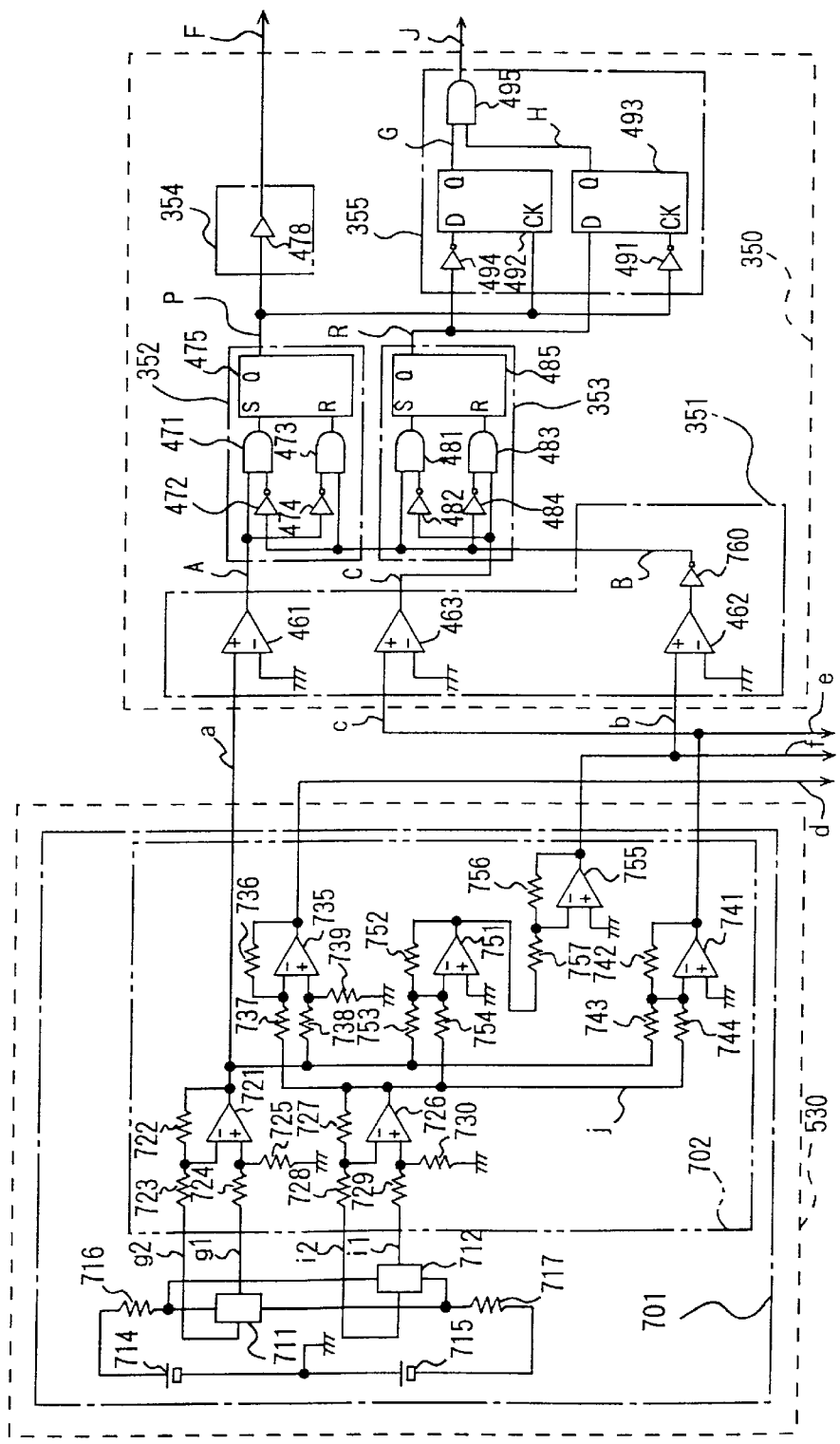
FIG. 22 is a circuit diagram showing configurations of a rotation detecting block 350 and a position detecting block 530 shown in FIG. 21.

FIGS. 21 and 22 show a brushless motor of a sixth embodiment of the present invention. FIG. 21 shows an entire configuration of the motor. In the embodiment, the rotation detecting block 350 shown in the third embodiment and comprising the first and second rotation signal producing circuits is used. The components which are identical with those of the above-mentioned embodiments are designated by the same reference numerals. That is, the field part 520, the three-phase coils 521, 522, and 523, the position detecting block 530, the drive block 40, the command block 50, and the stop operation block 60 are identical with those of the above-mentioned fifth embodiment, and their detailed description is omitted. Moreover, the motor structure is identical with that of FIG. 16 (however, the number of the position detecting elements is reduced to two). The rotation detecting block 350 of FIG. 21 comprises the shaped position signal producing circuit 351, the first rotation signal producing circuit 352, the second rotation signal producing circuit 353, the rotation signal output circuit 354, and the direction signal producing circuit 355. FIG. 22 specifically shows configurations of the position detecting block 530 and the rotation detecting block 350. FIGS. 23A through 23L show waveforms of signals in the rotation detecting block 350. The abscissae of FIGS. 23A through 23L indicate the time. In FIGS. 23A through 23L, the forward rotation state is carried out in the left side of the one-dot chain line, and the state is changed to the reverse rotation state at the one-dot chain line. The configuration of the position detecting circuit 701 of the position detecting block 530 is identical with that of the above-mentioned fifth embodiment of FIG. 20, and its detailed description is omitted. One set of three-phase output signals d, e, and f is produced on the basis of two-phase position signals g1 and g2, and i1 and i2 of the two position detecting elements 711 and 712, and supplied to the drive block 40. The other set of three-phase output signals a, b, and c is produced and supplied to the rotation detecting block 350 [see FIGS. 23A to 23C]. In the brushless motor of the embodiment, as shown in FIG. 22, the output signals e and f coincide with the output signals c and b, respectively.

The configuration of the rotation detecting block 350 is substantially identical with that of the third embodiment of FIG. 13, and the components having the same function are designated by the same reference numerals (in the embodiment, however, an inverting circuit 760 is added to the shaped position signal producing circuit 351). The shaped position signal producing circuit 351 of FIG. 22 is configured by the three comparators 461, 462, and 463 and the inverting circuit 760. The shaped position signal producing circuit 351 waveform-shapes the output signals a, b, and c of the position detecting circuit 701 and outputs the three-phase shaped position signal A, B, and C, respectively [see FIGS. 23D to 23F]. The comparators 461, 462, and 463 are configured in the same manner as those shown in FIG. 4.

The first rotation signal producing circuit 352 receives a pair of the shaped position signals A and B. In the first rotation signal producing circuit 352, the inverting circuit 472 and the AND circuit 471 produce the AND signal of the negation of the signal B and the signal A, and the AND signal is supplied to the set terminal of the set-reset type flip-flop circuit 475. The inverting circuit 474 and the AND circuit 473 produce the AND signal of the negation of the signal A and the signal B, and the AND signal is supplied to the reset terminal of the flip-flop circuit 475. As a result, the digital-type first rotation signal P is obtained at the output terminal of the flip-flop circuit 475. The level of the first rotation signal P is changed in synchronization with the shaped position signal A during the forward rotation, and changed in synchronization with the shaped position signal B during the reverse rotation. In the first rotational signal P, the noises at the timing of level change are eliminated [see FIG. 23G].

The second rotation signal producing circuit 353 receives another pair of the shaped position signals B and C. In the second rotation signal producing circuit 353, the inverting circuit 482 and the AND circuit 481 produce the AND signal of the negation of the signal C and the signal B, and the AND signal is supplied to the set terminal of the set-reset type flip-flop circuit 485. The inverting circuit 484 and the AND circuit 483 produce the AND signal of the negation of the signal B and the signal C, and the AND signal is supplied to the reset terminal of the flip-flop circuit 485. As a result, the digital-type second rotation signal R is obtained at the output terminal of the flip-flop circuit 485. The level of the second rotation signal R is changed in synchronization with the shaped position signal B during the forward rotation, and changed in synchronization with the shaped position signal C during the reverse rotation. In the second rotation signal R, the noises at the timing of level change are eliminated [see FIG. 23H].

The rotation signal output circuit 354 is configured by the buffer circuit 478, and outputs the first rotation signal P as the rotation signal F of the rotation detecting block 350. During the forward rotation, therefore, the level of the rotation signal F is changed in synchronization with the shaped position signal A. Since the shaped position signal A is obtained by waveform-shaping the output signal a which is in the same phase with the position signal g1, the rotation signal F corresponds to a shaped position signal of the position signal g1.

Figure 23:
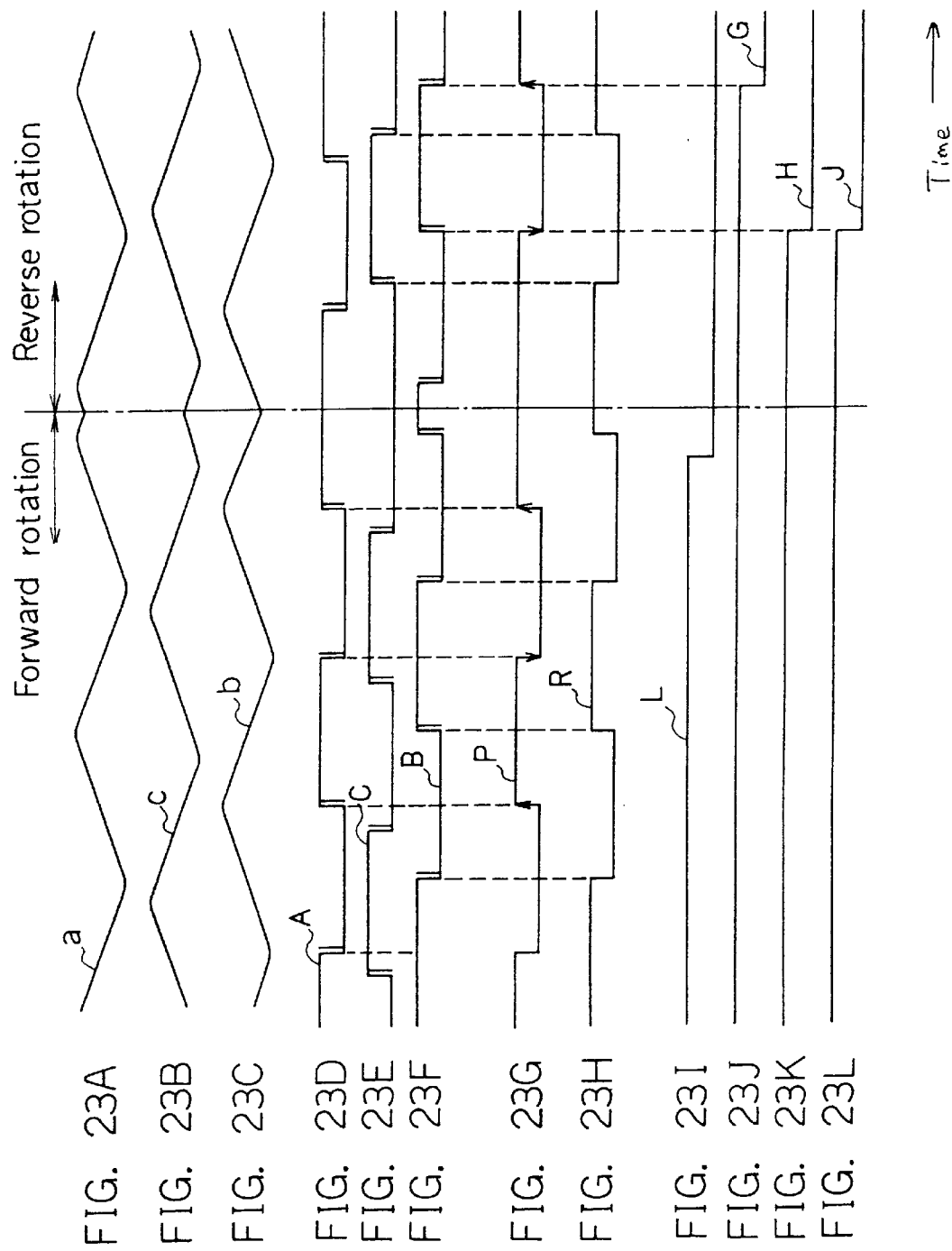
FIG. 23A is a waveform chart showing a waveform of an output signal a output from a position detecting circuit shown in FIG. 21.
FIG. 23B is a waveform chart showing a waveform of an output signal c output from the position detecting circuit shown in FIG. 21.
FIG. 23C is a waveform chart showing a waveform of an output signal b output from the position detecting circuit shown in FIG. 21.
FIG. 23D is a waveform chart showing a waveform of a shaped position signal A output from a shaped position signal producing circuit shown in FIG. 21.
FIG. 23E is a waveform chart showing a waveform of a shaped position signal C output from the shaped position signal producing circuit shown in FIG. 21.
FIG. 23F is a waveform chart showing a waveform of a shaped position signal B output from the shaped position signal producing circuit shown in FIG. 21.
FIG. 23G is a waveform chart showing a waveform of a first rotation signal P output from a first rotation signal producing circuit shown in FIG. 21.
FIG. 23H is a waveform chart showing a waveform of a second rotation signal R output from a second rotation signal producing circuit shown in FIG. 21.
FIG. 23I is a waveform chart showing a waveform of a direction command signal L output from a command signal producing circuit shown in FIG. 21.
FIG. 23J is a waveform chart showing a waveform of a first direction signal G output from a first flip-flop circuit shown in FIG. 22.
FIG. 23K is a waveform chart showing a waveform of a second direction signal H output from a second flip-flop circuit shown in FIG. 22.
FIG. 23L is a waveform chart showing a waveform of a direction signal J output from a direction signal producing circuit shown in FIG. 21.

The direction signal producing circuit 355 has the first flip-flop circuit 492 of the edge-trigger type, and the second flip-flop circuit 493 of the edge-trigger type. The first flip-flop circuit 492 latches the level of the second rotation signal R (more correctly, the negation of the signal R) by using the leading edge of the first rotation signal P as the clock signal, and outputs the first direction signal G. The second flip-flop circuit 493 latches the level of the second rotation signal R by using the falling edge of the first rotation signal P as the clock signal, and outputs the second direction signal H. The AND circuit 495 functioning as the direction signal output circuit produces the direction signal J in correspondence with the first and second direction signals G and H [see FIGS. 23J to 23L]. FIG. 23I shows a waveform of the direction command signal L. When the direction command signal L is changed from the forward rotation command ("H" level) to the reverse rotation command ("L" level), the reverse torque is generated, thereby decelerating the motor and then causing the field part to be rotated reversely (actually, the time period of the reverse rotation is short).

The drive block 40, the command block 50, and the stop operation block 60 in FIG. 21, and the relationships between the motor and the disk are the same as those of the above-mentioned fifth embodiment, and their detailed description is omitted. That is, the drive block 40 is identical with that of FIG. 5, the command block 50 with that of FIG. 6, the stop operation block 60 with that of FIG. 7, and the relationships between the motor and the disk with those of FIG. 8.

In the brushless motor of the embodiment, as the rotation signal F and the direction signal J are produced by using the position signals of the position detecting elements, it is entirely unnecessary to add further parts to the structure of the motor. Accordingly, a simple motor configuration can be realized. The three-phase output signals a, b, and c are produced by using the two-phase position signals of the two position detecting elements. Therefore, the motor structure can be very simplified.

In the rotation detecting block, the shaped position signal A is produced by shaping the output signal a which is in the same phase with the position signal g1 of the position detecting element, and the rotation signal F synchronized with the shaped position signal A is obtained by using a pair of the shaped position signals A and B. Therefore, an erroneous operation does not occur in the rotational speed measurement.

In the three-phase shaped position signals A, B, and C, the phase difference between the shaped position signals A and B is 90 degrees, that between the shaped position signals B and C is 60 degrees, and that between the shaped position signals C and A is 150 degrees (or 30 degrees). The first rotation signal P is produced by using the shaped position signals A and B, and the second rotation signal R is produced by using the shaped position signals B and C. Furthermore, the direction signal in correspondence with the level of the second rotation signal R at the timing of level change of the first rotation signal P is obtained. Therefore, the first and second rotation signals P and R and the direction signal are all stable so that no noises are contained. In other words, even when the shaped position signals A, B, and C contain the noises at each edge, it is possible to obtain the rotation signal F and the direction signal J without noises.

<<SEVENTH EMBODIMENT>>

Figure 24:
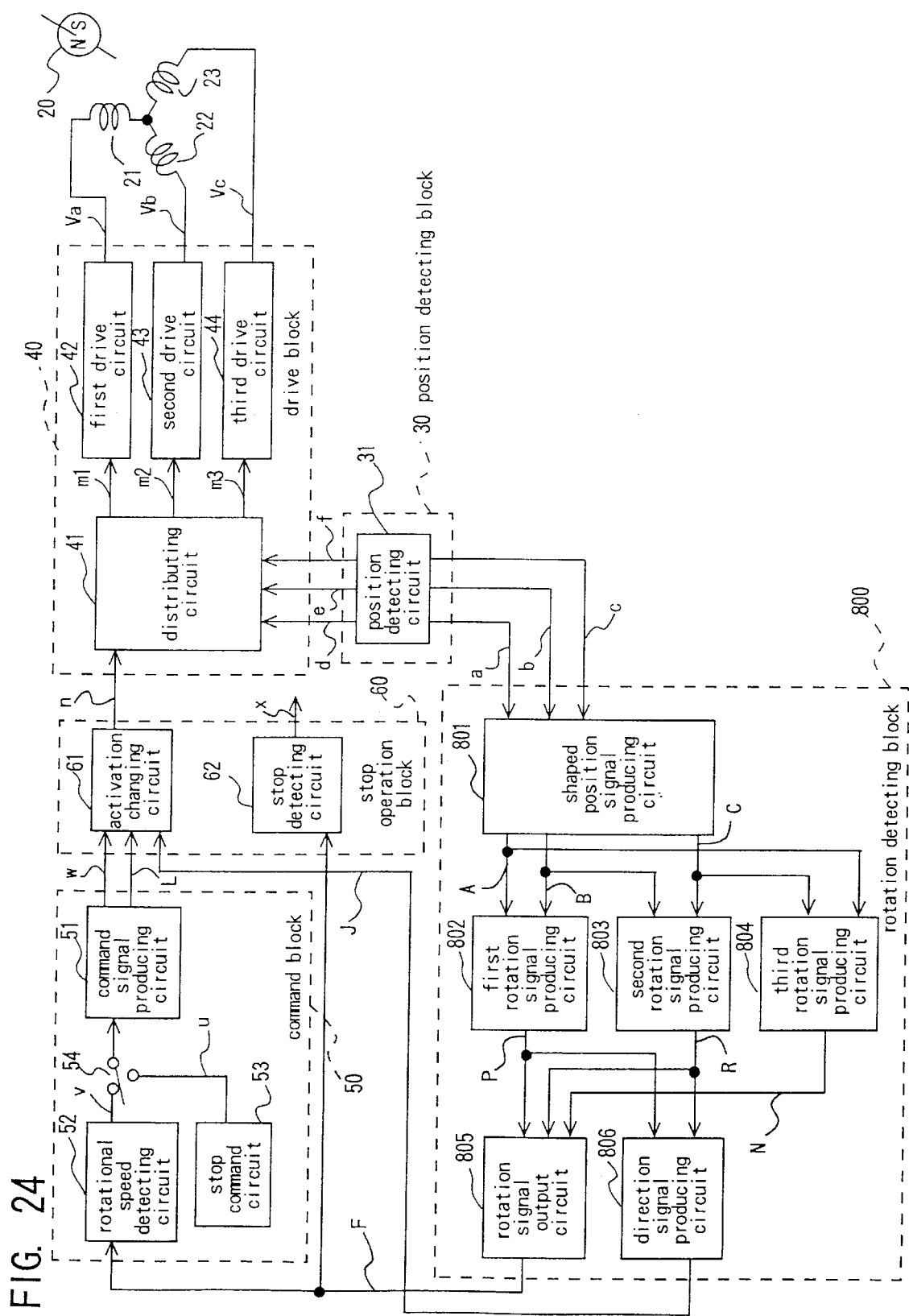
FIG. 24 is a block diagram showing an entire configuration of a brushless motor of a seventh embodiment of the present invention.
Figure 25:
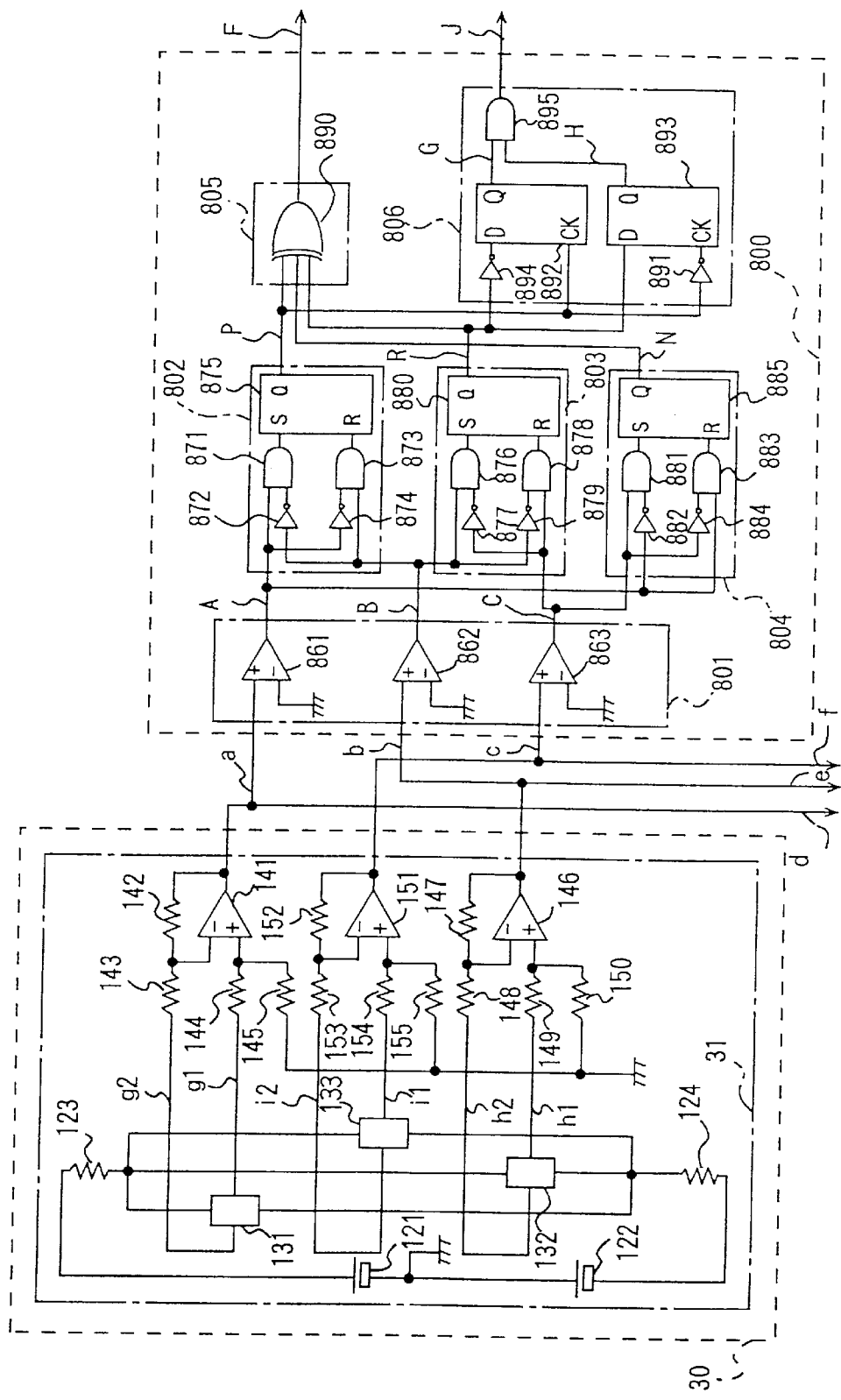
FIG. 25 is a circuit diagram showing configurations of a rotation detecting block 800 and a position detecting block 30 shown in FIG. 24.
Figure 26:
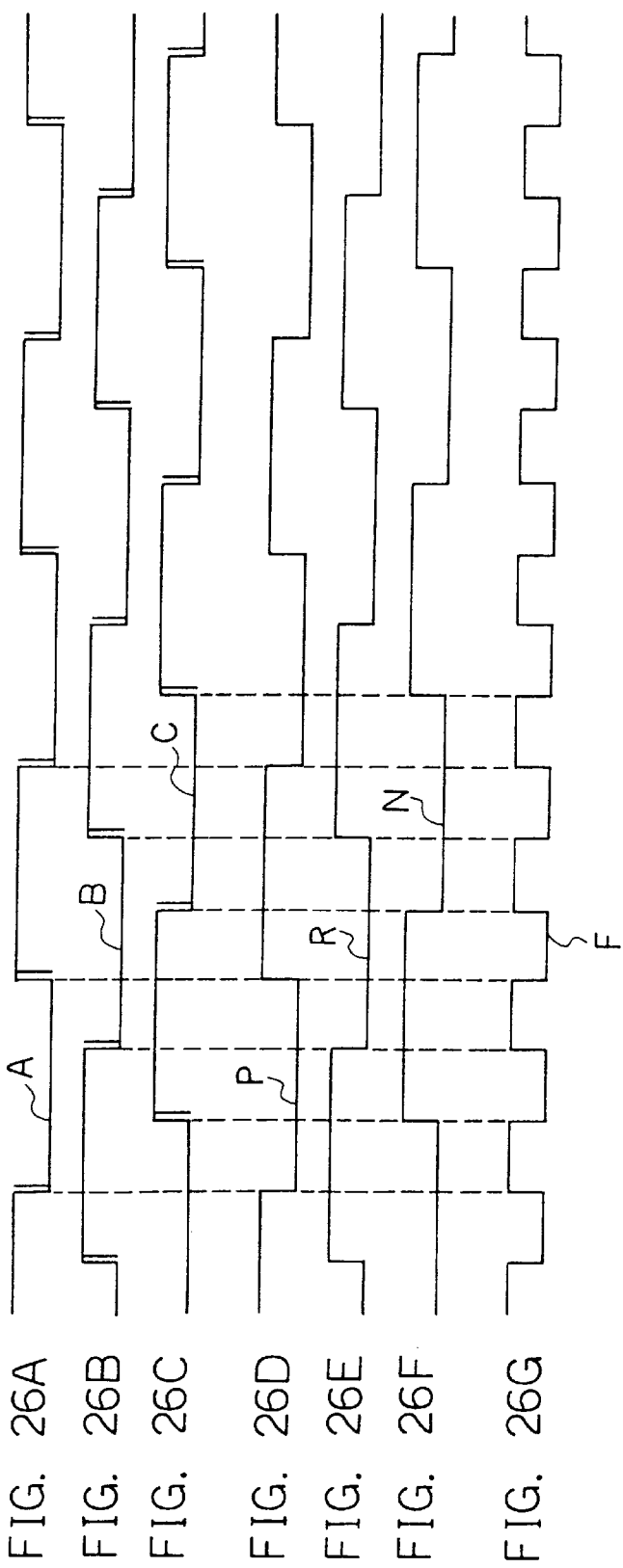
FIG. 26A is a waveform chart showing a waveform of a shaped position signal A output from a shaped position signal producing circuit shown in FIG. 24.
FIG. 26B is a waveform chart showing a waveform of a shaped position signal B output from the shaped position signal producing circuit shown in FIG. 24.
FIG. 26C is a waveform chart showing a waveform of a shaped position signal C output from the shaped position signal producing circuit shown in FIG. 24.
FIG. 26D is a waveform chart showing a waveform of a first rotation signal P output from a first rotation signal producing circuit shown in FIG. 24.
FIG. 26E is a waveform chart showing a waveform of a second rotation signal R output from a second rotation signal producing circuit shown in FIG. 24.
FIG. 26F is a waveform chart showing a waveform of a third rotation signal N output from a third rotation signal producing circuit shown in FIG. 24.
FIG. 26G is a waveform chart showing a waveform of a rotation signal F output from a rotation signal output circuit shown in FIG. 24.
Figure 27:
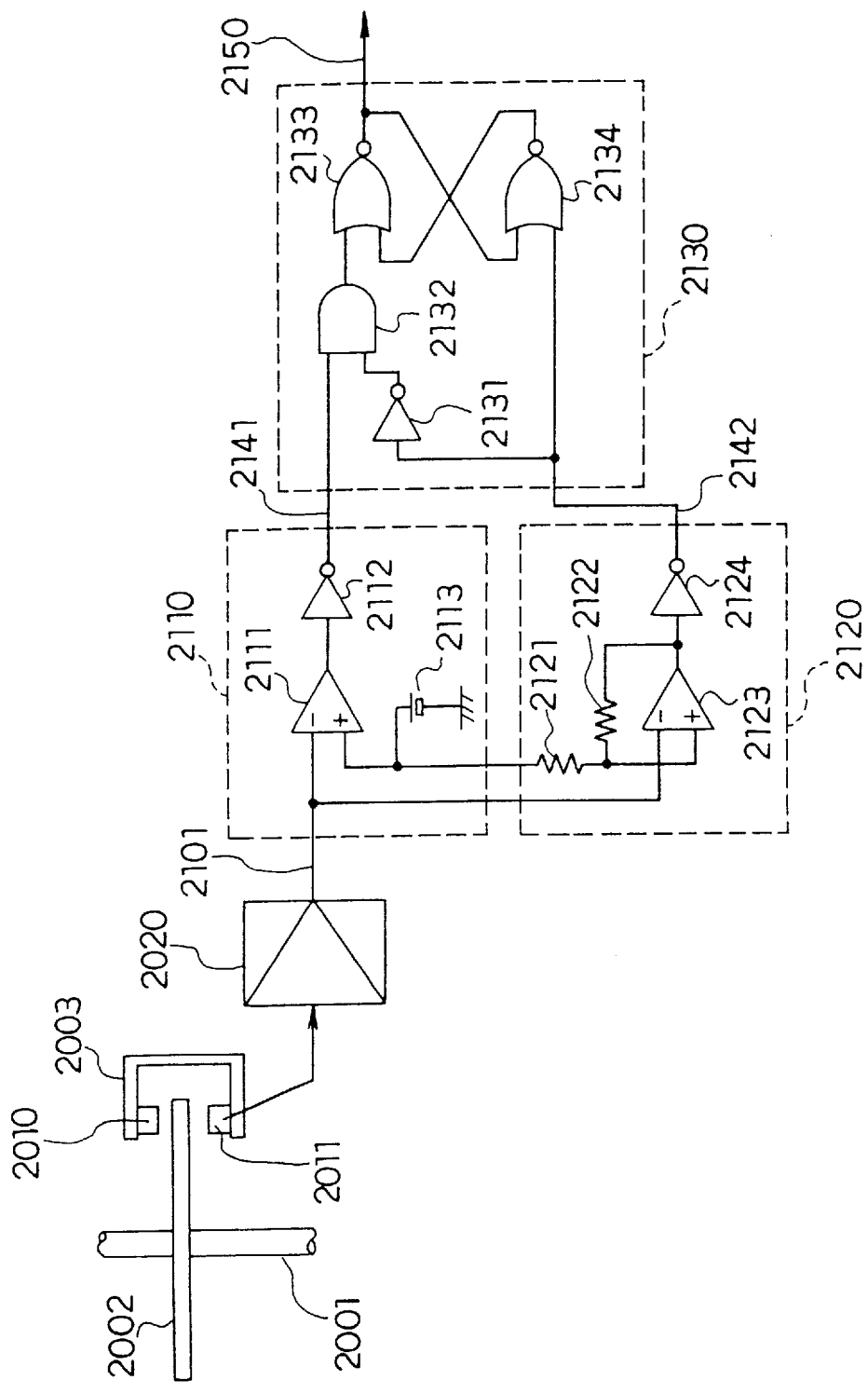
FIG. 27 is a block diagram showing a configuration of a detector for obtaining a rotation signal in the prior art.

FIGS. 24 and 25 show a brushless motor of a seventh embodiment of the present invention. FIG. 24 shows an entire configuration of the motor. In the embodiment, the configuration of the rotation detecting block of the first embodiment is modified so that the period of the rotation signal is shortened to one third of that of the position signal, thereby increasing the frequency of the rotational speed measurement.

In FIG. 24, the field part 20, the three-phase coils 21, 22, and 23, the drive block 40, the command block 50, and the stop operation block 60 are the same as those of the above-mentioned first embodiment, and their detailed description is omitted. The motor structure is identical with that of FIG. 2.

A rotation detecting block 800 of FIG. 24 comprises a shaped position signal producing circuit 801, a first rotation signal producing circuit 802, a second rotation signal producing circuit 803, a third rotation signal producing circuit 804, a rotation signal output circuit 805, and a direction signal producing circuit 806.

FIG. 25 specifically shows configurations of the position detecting block 30 and the rotation detecting block 800. FIGS. 26A through 26G show waveforms of signals in the rotation detecting block 800. The abscissae of FIGS. 26A through 26G indicate the time. The configuration of the position detecting circuit 31 of the position detecting block 30 is identical with that of the above-mentioned first embodiment of FIG. 3, and its detailed description is omitted. Three-phase position signals g1 and g2, h1 and h2, and i1 and i2 appearing in the three position detecting element 131, 132, and 133 are differentially amplified to produce three-phase output signals d, e, and f, and three-phase output signals a, b, and c. The output signals d, e, and f are supplied to the drive block 40, and the output signals a, b, and c to the rotation detecting block 800. In the embodiment, the output signals a, b, and c coincide with the output signals d, e, and f, respectively.

The shaped position signal producing circuit 801 of the rotation detecting block 800 is configured by three comparators 861, 862, and 863. The shaped position signal producing circuit 801 waveform-shapes the output signals a, b, and c of the position detecting circuit 31 and outputs the three-phase shaped position signal A, B, and C [see FIGS. 26A to 26C]. The comparators 861, 862, and 863 are configured in the same manner as those shown in FIG. 4.

The first rotation signal producing circuit 802 receives a pair of the shaped position signals A and B. In the first rotation signal producing circuit 802, an inverting circuit 872 and an AND circuit 871 produce the AND signal of the negation of the signal B and the signal A, and the AND signal is supplied to the set terminal of a set-reset type flip-flop circuit 875. An inverting circuit 874 and an AND circuit 873 produce the AND signal of the negation of the signal A and the signal B, and the AND signal is supplied to the reset terminal of the flip-flop circuit 875. As a result, the digital-type first rotation signal P is obtained at the output terminal of the flip-flop circuit 875. The level of the first rotation signal P is changed in synchronization with the shaped position signal A during the forward rotation, and changed in synchronization with the shaped position signal B during the reverse rotation. In the first rotation signal P, the noises at the timing of level change are eliminated [see FIG. 26D].

The second rotation signal producing circuit 803 receives another pair of the shaped position signals B and C. In the second rotation signal producing circuit 803, an inverting circuit 877 and an AND circuit 876 produce the AND signal of the negation of the signal C and the signal B, and the AND signal is supplied to the set terminal of a set-reset type flip-flop circuit 880. An inverting circuit 879 and an AND circuit 878 produce the AND signal of the negation of the signal B and the signal C, and the AND signal is supplied to the reset terminal of the flip-flop circuit 880. As a result, the digital-type second rotation signal R is obtained at the output terminal of the flip-flop circuit 880. The level of the second rotation signal R is changed in synchronization with the shaped position signal B during the forward rotation, and changed in synchronization with the shaped position signal C during the reverse rotation. In the second rotation signal R, the noises at the timing of level change are eliminated [see FIG. 26E].

The third rotation signal producing circuit 804 receives another pair of the shaped position signals C and A. In the third rotation signal producing circuit 804, an inverting circuit 882 and an AND circuit 881 produce an AND signal of the negation of the signal A and the signal C, and the AND signal is supplied to the set terminal of a set-reset type flip-flop circuit 885. An inverting circuit 884 and an AND circuit 883 produce an AND signal of the negation of the signal C and the signal A, and the AND signal is supplied to the reset terminal of the flip-flop circuit 885. As a result, a digital-type third rotation signal N is obtained at the output terminal of the flip-flop circuit 885. The level of the third rotation signal N is changed in synchronization with the shaped position signal C during the forward rotation, and changed in synchronization with the shaped position signal A during the reverse rotation. In the third rotation signal N, the noises at the timing of level change are eliminated [see FIG. 26F].

The rotation signal output circuit 805 is configured by an exclusive OR circuit 890 to which the first, second, and third rotation signals P, R, and N are supplied, and the exclusive OR circuit 890 outputs the rotation signal F. When an odd number of the first, second, and third rotation signals P, R, and N are "H" level, the rotation signal F is "H," and, when an even number of the rotation signals are "H" level, the rotation signal F is "L" [see FIG. 26G]. Since the first, second, and third rotation signals P, R, and N are the digital signals with a phase difference of 120 degrees, the rotation signal F is a high-frequency pulse signal with one third of a period of the shaped position signal. That is, the period of the rotation signal F is one third of that of the position signal g1.

The direction signal producing circuit 806 has a first flip-flop circuit 892 of the edge-trigger type, and a second flip-flop circuit 893 of the edge-trigger type. The first flip-flop circuit 892 latches the level of the second rotation signal R (more correctly, the negation of the signal R) by using the leading edge of the first rotation signal P as the clock signal, and outputs the first direction signal G. The second flip-flop circuit 893 latches the level of the second rotation signal R by using the falling edge of the first rotation signal P as the clock signal, and outputs the second direction signal H. An AND circuit 895 functioning as the direction signal output circuit produces the direction signal J in correspondence with the first and second direction signals G and H and outputs the direction signal.

In addition to the effects of the first embodiment, the brushless motor of the embodiment can attain an effect that the period of the rotation signal F is shortened to one third and the rotational speed detecting circuit 52 of the command block 50 can conduct the rotational speed measurement of a high frequency. As a result, the gain of the rotational speed control can be set to be high and hence accurate measurement and control can be realized.

The configurations of the above-mentioned embodiments may be modified in various manners. For example, the coil for each phase may be configured by connecting a plurality of sub-coils in series or in parallel. Each coil may consist of a concentrated winding, or a distributed winding, or may be an air-core coil having no salient pole. The connection of the three-phase coils is not restricted to the Y-connection and the Δ-connected coils may be used. The position detecting elements are not restricted to Hall elements and other magnetoelectrical converting elements. The relative positional relationships among the coils and the position detecting elements may be variously modified. The configuration of the field part is not restricted to that of the above-mentioned embodiments. Furthermore, the number of poles is not limited to four.

The drive block is not restricted to the one which distributes three-phase driving voltages in accordance with the output signals of the position detecting circuit. The drive block may distribute three-phase driving currents. The drive block is not restricted to the one which supplies an analog-like driving voltage to the coils, and may be configured so as to supply a PWM driving pulse voltage to the coils in accordance with a PWM signal (Pulse-Width Modulation signal) of a pulse width in correspondence with the distributed signals.

The configurations of the command block and the stop operation block are not restricted to those of the above-mentioned embodiments. For example, the activation changing circuit may directly stop the command signal producing circuit, the distributing circuit, the drive circuits, or the like. The drive block may select the coil to be activated in correspondence with not only the output signals of the position detecting block but also the direction command signal.

The timing of level change of the rotation signal produced in the rotation detecting block may be set to coincide with the timing of level change of the shaped position signal A in both the forward rotation and the reverse rotation. The mechanical configuration of the coupling between the disk and the motor shaft, or the ejection part for unloading is not restricted to that of the above-mentioned embodiments.

It is a matter of course that the invention may be variously modified without departing from the spirit of the present invention, and such modifications are within the scope of the present invention.

I claim:

1. A brushless motor comprising:

field means for generating a magnetic field flux by using a permanent magnet, plural-phase coils interlinking with said magnetic field flux, position detecting means for detecting a relative position between said field means and said coils, and for obtaining plural-phase position signals which vary in a continuous manner, rotation detecting means for obtaining a rotation signal and a direction signal in correspondence with output signals of said position detecting means, command means for outputting an activation command signal, and drive means for supplying an electric power in correspondence with said activation command signal to said coils corresponding to said position signals, said rotation detecting means comprising:

shaped position signal producing means for producing three-phase shaped position signals which are electrically different from in phase based upon three-phase output signals of said position detecting means, rotation signal producing means for obtaining said rotation signal which is synchronized with said shaped position signals, and direction signal producing means for obtaining said direction signal in correspondence with a level of one of said shaped position signals at a timing of a level change of said rotation signal.

2. A brushless motor comprising:

field means for generating a magnetic field flux by using a permanent magnet, plural-phase coils interlinking with said magnetic field flux, position detecting means for detecting a relative position between said field means and said coils, and for obtaining plural-phase position signals which vary in a continuous manner, rotation detecting means for obtaining a rotation signal and a direction signal in correspondence with output signals of said position detecting means, command means for outputting an activation command signal, and drive means for supplying an electric power in correspondence with said activation command signal to said coils corresponding to said position signals, said rotation detecting means comprising:

shaped position signal producing means for producing three-phase shaped position signals A, B, and C which are electrically different from each other in phase based upon three-phase output signals of said position detecting means, rotation signal producing means for eliminating noises at a timing of a level change of said rotation signal by using a pair of said shaped position signals A and B, and for obtaining said rotation signal which is synchronized with either of said shaped position signals A and B, and direction signal producing means for obtaining said direction signal in correspondence with a level of said shaped position signal C at said timing of a level change of said rotation signal.

3. A brushless motor in accordance with claim 2, wherein said rotation signal producing means includes flip-flop means in which an AND signal of said shaped position signal A and a negation of said shaped position signal B is supplied to a set terminal, and an AND signal of said shaped position signal B and a negation of said shaped position signal A is supplied to a reset terminal, and said rotation signal is obtained from an output terminal of said flip-flop means.

4. A brushless motor in accordance with claim 2, wherein said direction signal producing means includes flip-flop means for outputting said direction signal in correspondence with said level of said shaped position signal C at said timing of level change of said rotation signal.

5. A brushless motor in accordance with claim 2, wherein said motor further comprising:

means for obtaining said shaped position signal A which is obtained by shaping a position signal of a position detecting element of said position detecting means, and for producing said rotation signal a level of which is changed at said timing of a level change of said shaped position signal A.

6. A brushless motor in accordance with claim 2, wherein said shaped position signal producing means includes three comparator means which have no hysteresis, and said three comparator means shape said three-phase output signals of said position detecting means, thereby producing said three-phase shaped position signals A, B, and C.

7. A brushless motor comprising:

field means for generating a magnetic field flux by using a permanent magnet, plural-phase coils interlinking with said magnetic field flux, position detecting means for detecting a relative position between said field means and said coils, and for obtaining plural-phase position signals which vary in a continuous manner, rotation detecting means for obtaining a rotation signal and a direction signal in correspondence with output signals of said position detecting means, command means for outputting an activation command signal, and drive means for supplying an electric power in correspondence with said activation command signal to said coils corresponding to said position signals, said rotation detecting means comprising:

shaped position signal producing means for producing three-phase shaped position signals A, B, and C which are electrically different from each other in phase based upon three-phase output signals of said position detecting means, first rotation signal producing means for eliminating noises at a timing of a level change of a first rotation signal by using a pair of said shaped position signals A and B, and for obtaining said first rotation signal which is synchronized with either of said shaped position signals A and B, second rotation signal producing means for eliminating noises at a timing of a level change of a second rotation signal by using another pair of said shaped position signals B and C, and for obtaining said second rotation signal which is synchronized with either of said shaped position signals B and C, rotation signal output means for outputting said rotation signal in correspondence with at least one of said first and second rotation signals, and direction signal producing means for obtaining said direction signal in correspondence with a level of said second rotation signal at said timing of a level change of said first rotation signal.

8. A brushless motor comprising:

field means for generating a magnetic field flux by using a permanent magnet, plural-phase coils interlinking with said magnetic field flux, position detecting means for detecting a relative position between said field means and said coils, and for obtaining plural-phase position signals which vary in a continuous manner, rotation detecting means for obtaining a rotation signal and a direction signal in correspondence with output signals of said position detecting means, command means for outputting an activation command signal, and drive means for supplying an electric power in correspondence with said activation command signal to said coils corresponding to said position signals, said rotation detecting means comprising:

shaped position signal producing means for producing three-phase shaped position signals A, B, and C which are electrically different from each other in phase based upon three-phase output signals of said position detecting means, first rotation signal producing means for eliminating noises at a timing of level change of a first rotation signal by using a pair of said shaped position signals A and B, and for obtaining said first rotation signal which is synchronized with either of said shaped position signals A and B, second rotation signal producing means for eliminating noises at a timing of a level change of a second rotation signal by using another pair of said shaped position signals B and C, and for obtaining said second rotation signal which is synchronized with either of said shaped position signals B and C, third rotation signal producing means for eliminating noises at a timing of a level change of a third rotation signal by using another pair of said shaped position signals C and A, and for obtaining said third rotation signal which is synchronized with either of said shaped position signals C and A, rotation signal output means for composing said first, second, and third rotation signals with each other so as to output said rotation signal, and direction signal producing means for obtaining said direction signal in correspondence with a level of said second rotation signal at said timing of a level change of said first rotation signal.

9. A brushless motor comprising:

field means for generating a magnetic field flux by using a permanent magnet, plural-phase coils interlinking with said magnetic field flux, position detecting means for detecting a relative position between said field means and said coils, and for obtaining plural-phase position signals which vary in a continuous manner, rotation detecting means for obtaining a rotation signal and a direction signal in correspondence with output signals of said position detecting means, command means for outputting an activation command signal and a direction command signal, drive means for supplying an electric power in correspondence with said activation command signal to said coils corresponding to said position signals, and stop operation means for stopping rotation of said motor in correspondence with said direction command signal and said direction signal, said rotation detecting means comprising:

shaped position signal producing means for producing three-phase shaped position signals A, B, and C which are electrically different from each other in phase based upon three-phase output signals of said position detecting means, rotation signal producing means for eliminating noises at a timing of a level change of said rotation signal by using a pair of said shaped position signals A and B, and for obtaining the rotation signal which is synchronized with either of said shaped position signals A and B, and direction signal producing means for obtaining said direction signal in correspondence with a level of said shaped position signal C at said timing of a level change of said rotation signal, said stop operation means including activation changing means for supplying a required electric power in correspondence with said activation command signal to said coils when said direction command signal indicates a forward rotation command or said direction signal indicates a forward rotation, and for stopping activation of said coils when said direction command signal indicates a reverse rotation command and said direction signal indicates a reverse rotation.

10. A brushless motor in accordance with claim 9, wherein said command means comprises:

rotational speed detecting means for obtaining a speed detecting signal in correspondence with said rotation signal, stop command means for outputting a stop command signal, and command producing means for outputting said activation command signal and said direction command signal in correspondence with an output signal of said rotational speed detecting means during a rotation command operation, and for outputting said activation command signal and said direction command signal in correspondence with said output signal of said stop command means during a stop command operation.

11. A brushless motor in accordance with claim 9, wherein said shaped position signal producing means includes three comparator means which have no hysteresis, and said three comparator means shape said three-phase output signals of said position detecting means, thereby producing said three-phase shaped position signals A, B, and C.

12. A brushless motor used for rotating a disk, comprising:

field means for generating a magnetic field flux by using a permanent magnet, plural-phase coils interlinking with said magnetic field flux, position detecting means for detecting a relative position between said field means and said coils, and for obtaining plural-phase position signals which vary in a continuous manner, rotation detecting means for obtaining a rotation signal and a direction signal in correspondence with output signals of said position detecting means, command means for outputting a direction command signal and an activation command signal so as to produce a forward torque in rotation command operation and a reverse torque in a stop command operation, drive means for supplying an electric power in correspondence with said activation command signal to said coils corresponding to said position signals, and stop operation means for stopping rotation of said motor in correspondence with said direction command signal and said direction signal, said rotation detecting means comprising:
  shaped position signal producing means for producing plural-phase shaped position signals which are electrically different from each other in phase based upon output signals of said position detecting means,
  rotation signal producing means for producing said rotation signal synchronized with said shaped position signals, and
  direction signal producing means for producing said direction signal corresponding to a rotation of said field means by using said plural-phase shaped position signals,
said stop operation means comprising:
  activation changing means for supplying a required electric power to said coils in correspondence with said activation command signal and said direction command signal when said direction command signal indicates a forward rotation command or said direction signal indicates a forward rotation, and for stopping a activation of said coils when said direction command signal indicates a reverse rotation and said direction signal indicates a reverse rotation,
  stop detecting means for outputting a stop operation signal when a time interval of said rotation signal becomes larger than a predetermined value in said stop command operation, and
  unloading means for unloading said disk in response to said stop operation signal.

13. A brushless motor in accordance with claim 12, wherein said rotation detecting means further comprising:
  shaped position signal producing means for shaping three-phase output signals of said position detecting means so as to produce plural-phase shaped position signals which are electrically different from each other in phase,
  rotation signal producing means for obtaining said rotation signal which is synchronized with said shaped position signal, and
  direction signal producing means for obtaining said direction signal in correspondence with a level of said shaped position signal at said level change of said rotation signal.

14. A brushless motor in accordance with claim 12, wherein said rotation detecting means further comprising:
  shaped position signal producing means for shaping three-phase output signals of said position detecting means so as to produce three-phase shaped position signals A, B, and C which are electrically different from each other in phase,
  rotation signal producing means for eliminating noises at a timing of level change of said rotation signal by using a pair of said shaped position signals A and B, and for obtaining said rotation signal which is synchronized with either of said shaped position signals A and B, and
  direction signal producing means for obtaining said direction signal in correspondence with a level of said shaped position signal C at a level change of said rotation signal.

15. A brushless motor in accordance with claim 12, wherein said rotation detecting means further comprising:
  shaped position signal producing means for shaping three-phase output signals of said position detecting means so as to produce three-phase shaped position signals A, B, and C which are electrically different from each other in phase,
  first rotation signal producing means for eliminating noises at a timing of level change of a first rotation signal by using a pair of said shaped position signals A and B, and for obtaining said first rotation signal which is synchronized with either of said shaped position signals A and B,
  second rotation signal producing means for eliminating noises at a timing of level change of a second rotation signal by using another pair of said shaped position signals B and C, and for obtaining said second rotation signal which is synchronized with either of said shaped position signals B and C,
  rotation signal output means for outputting said rotation signal in correspondence with at least one of said first and second rotation signals, and
  direction signal producing means for obtaining said direction signal in correspondence with a level of said second rotation signal at said timing of a level change of said first rotation signal.

16. A brushless motor in accordance with claim 12, wherein said rotation detecting means further comprising:
  shaped position signal producing means for shaping three-phase output signals of said position detecting means so as to produce three-phase shaped position signals A, B, and C which are electrically different from each other in phase,
  first rotation signal producing means for eliminating noises at a timing of level change of a first rotation signal by using a pair of said shaped position signals A and B, and for obtaining said first rotation signal which is synchronized with either of said shaped position signals A and B,
  second rotation signal producing means for eliminating noises at a timing of level change of a second rotation signal by using another pair of said shaped position signals B and C, and for obtaining said second rotation signal which is synchronized with either of said shaped position signals B and C,
  third rotation signal producing means for eliminating noises at a timing of level change of a third rotation signal by using another pair of said shaped position signals C and A, and for obtaining said third rotation signal which is synchronized with either of said shaped position signals C and A,
  rotation signal output means for composing said first, second, and third rotation signals with each other so as to output said rotation signal, and
  direction signal producing means for obtaining said direction signal in correspondence with a level of said second rotation signal at said timing of a level change of said first rotation signal.

17. A brushless motor in accordance with claim 12, wherein said shaped position signal producing means includes three comparator means which have no hysteresis, and said three comparator means shape said three-phase output signals of said position detecting means, thereby producing said three-phase shaped position signals A, B, and C.

18. A brushless motor in accordance with claim 12, wherein said command means comprises:
  rotational speed detecting means for obtaining a speed detecting signal in correspondence with said rotation signal,
  stop command means for outputting a stop command signal, and
  command producing means for outputting said activation command signal and said direction command signal in correspondence with an output signal of said rotational speed detecting means during a rotation command operation, and for outputting said activation command signal and said direction command signal in correspondence with said stop command signal during a stop command operation.

* * * * *